United States Patent
Matsuda et al.

(10) Patent No.: US 11,818,067 B2
(45) Date of Patent: Nov. 14, 2023

(54) COMMUNICATION DEVICE, COMMUNICATION METHOD, AND PROGRAM

(71) Applicant: Sony Corporation, Tokyo (JP)

(72) Inventors: Hiroki Matsuda, Tokyo (JP); Kazuyuki Shimezawa, Kanagawa (JP); Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 16/492,609

(22) PCT Filed: Feb. 6, 2018

(86) PCT No.: PCT/JP2018/003880
§ 371 (c)(1),
(2) Date: Sep. 10, 2019

(87) PCT Pub. No.: WO2018/173515
PCT Pub. Date: Sep. 27, 2018

(65) Prior Publication Data
US 2021/0143963 A1  May 13, 2021

(30) Foreign Application Priority Data

Mar. 24, 2017  (JP) .................................. 2017-059436

(51) Int. Cl.
*H04L 5/00* (2006.01)
*H04L 5/02* (2006.01)
(52) U.S. Cl.
CPC .......... *H04L 5/0053* (2013.01); *H04L 5/0094* (2013.01)
(58) Field of Classification Search
CPC ... H04L 5/0053; H04L 5/0094; H04L 5/0096; H04L 5/06; H04L 5/023; H04L 5/0037; H04L 5/0058; H04L 5/0078; H04L 5/14
See application file for complete search history.

(56) References Cited

U.S. PATENT DOCUMENTS

2010/0279628 A1*  11/2010  Love .................... H04L 5/0091
455/70
2011/0124357 A1*  5/2011  Kim ..................... H04L 1/0009
455/507
(Continued)

FOREIGN PATENT DOCUMENTS

CN         106507497 A      3/2017
JP         2016514416 A     5/2016
(Continued)

OTHER PUBLICATIONS

Extended European Search Report dated Mar. 2, 2020, issued in corresponding European Patent Application No. 18771648.5, 7 pages.

(Continued)

*Primary Examiner* — Diane L Lo
*Assistant Examiner* — Abusayeed M Haque
(74) *Attorney, Agent, or Firm* — XSENSUS LLP

(57) ABSTRACT

An object of the present invention is to enable flexible design depending on use cases and to further improve the transmission efficiency of the entire system.
A communication device includes: an acquisition unit configured to acquire first control information and second control information relating to a plurality of resources specified by a frequency and time available for data transmission; and a control unit configured to perform control in such a manner that data is transmitted to a transmission target after a resource is arbitrarily selected from the plurality of resources on the basis of the first control information, in which the control unit controls selection of the resource from among the plurality of resources on a basis of the second control information.

13 Claims, 25 Drawing Sheets

(56) References Cited

U.S. PATENT DOCUMENTS

| | | | |
|---|---|---|---|
| 2011/0292895 A1* | 12/2011 | Wager | H04L 5/0091 370/329 |
| 2013/0132854 A1* | 5/2013 | Raleigh | G06F 3/0482 715/738 |
| 2013/0163533 A1* | 6/2013 | Anderson | H04L 1/1812 370/329 |
| 2013/0163535 A1* | 6/2013 | Anderson | H04L 1/0041 370/329 |
| 2013/0163537 A1* | 6/2013 | Anderson | H04L 1/1671 370/329 |
| 2016/0174194 A1* | 6/2016 | Suzuki | H04W 72/0446 370/312 |
| 2016/0270116 A1* | 9/2016 | Lin | H04W 72/1273 |
| 2016/0309466 A1* | 10/2016 | Chen | H04W 72/20 |
| 2016/0309496 A1* | 10/2016 | Huang | H04W 72/56 |
| 2017/0264408 A1* | 9/2017 | Patel | H04L 5/0048 |
| 2018/0007673 A1* | 1/2018 | Fwu | H04W 4/70 |
| 2018/0035458 A1* | 2/2018 | Islam | H04L 1/16 |
| 2018/0219653 A1* | 8/2018 | Marsch | H04L 5/005 |
| 2018/0324839 A1* | 11/2018 | Feng | H04W 72/21 |
| 2019/0058516 A1* | 2/2019 | Yang | H04W 74/0841 |
| 2019/0159110 A1* | 5/2019 | Takahashi | H04W 48/10 |
| 2019/0165899 A1* | 5/2019 | Gao | H04L 1/1816 |
| 2019/0327066 A1* | 10/2019 | Gao | H04L 5/0044 |

FOREIGN PATENT DOCUMENTS

| | | |
|---|---|---|
| JP | 2016-529807 A | 9/2016 |
| RU | 2549365 C2 | 4/2015 |
| WO | WO-2016205992 A1 | 12/2016 |
| WO | WO-2017000143 A1 | 1/2017 |
| WO | WO-2017016425 A1 | 2/2017 |

OTHER PUBLICATIONS

Further Discussion on DCI in NR, R1-1703408, 3GPP TSG RAN WG1 Meeting #88, Athens, Greece Feb. 13-17, 2017, 6 pages.
International Search Report and Written Opinion dated Mar. 27, 2018 for PCT/JP2018/003880 filed on Feb. 6, 2018, 18 pages including English Translation of the International Search Report.
Zte et al., "Basic grant-free transmission for URLLC", 3GPP TSG RAN WG 1 Meeting # 88, Feb. 7, 2017, R1-1701594, pp. 1-8.
Intel Corporation, "Grant-free UL transmissions in NR", 3GPP TSG-RAN WG1 # 86bis, Oct. 1, 2016, R1-1609499, pp. 1-8.
Nokia et al., "Grant-free to grant-based switching for URLLC", 3GPP TSG-RAN WG1 # 87, Nov. 5, 2016, R1-1612253, pp. 1-3.
Ericsson, "On UL grant-free transmission", 3GPP TSG-RAN WG1 # 88, Feb. 13-17, 2017, R1-1701871, pp. 1-2.
Ericsson , Resource Configuration for Grant-free Access , 3GPP TSG-RANWG1 adhoc_NR_AH_1701 R1-1700693 , 3GPP , Jan. 9, 2017.
LG Electronics , Discussion on grant-based and grant-free UL transmissions for latency reduction , 3GPP TSG-RAN WG1#88 R1-1702490 , 3GPP, Feb. 7, 2017.
LG Electronics , Discussion on multiplexing of eMBB and URLLC for uplink , 3GPP TSG-RAN WG1#88 R1-1702489 , 3GPP , Feb. 7, 2017.
Catt, Dynamic TDD slot structure, 3GPP TSG RAN WG1 #88 R1 / 1702112, 3GPP, 2017, 02 months, 07.
Ericsson, Content and distribution of minimum SI, 3GPP TSG RAN WG2 #96 R2 / 168287, 3GPP, Nov. 5, 2016, 2016.
Nokia, Alcatel / Lucent Shanghai Bell, UL grant—free transmission for URLLC, 3GPP TSG RAN WG1 #88 R1 / 1703329, 3GPP, 2017, Jan. 6, 2002.

\* cited by examiner

FIG. 6

| | SUB CARRIER SPACING | NUMBER OF SUB CARRIERS PER RESOURCE BLOCK IN NR CELL | NUMBER OF SYMBOLS PER SUB FRAME | CP LENGTH TYPE |
|---|---|---|---|---|
| PARAMETER SET 0 | 15 kHz | 12 | 14 | TYPE 1 |
| PARAMETER SET 1 | 7.5 kHz | 24 | 7 | TYPE 1 |
| PARAMETER SET 2 | 30 kHz | 6 | 28 | TYPE 1 |
| PARAMETER SET 3 | 15 kHz | 12 | 12 | TYPE 2 |
| ... | ... | ... | ... | ... |

COMMUNICATION DEVICE, COMMUNICATION METHOD, AND PROGRAM

CROSS-REFERENCE TO RELATED APPLICATIONS

The present application is based on PCT filing PCT/JP2018/003880, filed Feb. 6, 2018, which claims priority to JP 2017-059436, filed Mar. 24, 2017, the entire contents of each are incorporated herein by reference.

TECHNICAL FIELD

The present disclosure relates to a communication device, a communication method, and a program.

BACKGROUND ART

Radio access schemes and wireless networks for cellular mobile communication (hereinafter, also referred to as "long-term evolution (LTE)", "LTE-advanced (LTE-A)" "LTE-advanced pro (LTE-A Pro)", "new radio (NR)". "new radio access technology (NRAT)", "evolved universal terrestrial radio access (EUTRA)", or "Further EUTRA (FEUTRA)") are examined in the third generation partnership project (3GPP). Note that, in the following description, LTE includes LTE-A, LTE-A Pro, and EUTRA, and NR includes the fifth generation mobile wireless communication (5G), NRAT, and FEUTRA. In LTE and NR, a base station device (base station) is also referred to as an eNodeB (evolved Node B), and a terminal device (mobile station, mobile station device, or terminal) is also referred to as user equipment (UE). LTE and NR are cellular communication systems in which a plurality of areas covered by base station devices is arranged in the form of cells. A single base station device may manage a plurality of cells.

As a next-generation radio access scheme after LTE, NR is radio access technology (RAT) different from LTE. NR is access technology capable of handling various use cases including enhanced mobile broadband (eMBB), massive machine type communications (mMTC), and Ultra reliable and low latency communications (URLLC). NR is examined aiming at a technical framework corresponding to use scenarios, requirements, and deployment scenarios in those use cases. A grant-free transmission technique attracts attention as one of techniques that enables reduction of delay required by URILLC. According to the grant-free transmission technique, a terminal device can transmit data to a base station without receiving a resource allocation instruction from a base station device of the base station. Note that details of grant-free transmission are disclosed in, for example, Non-Patent Document 1.

CITATION LIST

Non-Patent Document

Non-Patent Document 1: 3GPP, RAN1, R1-1701871, Ericsson, "On UL grant-free transmission". February, 2017.

SUMMARY OF THE INVENTION

Problems to be Solved by the Invention

Meanwhile, in NR, use in various use cases is assumed, and a mechanism that enables flexible design depending on use cases is required. From such a background, it is desired to provide technology that allows the operation related to grant-free transmission to be controlled more flexibly even under a situation where the grant-free transmission is performed, thereby further improving the transmission efficiency of the entire system.

Therefore, the present disclosure proposes technology that enables flexible design depending on use cases and is capable of further improving the transmission efficiency of the entire system.

Solutions to Problems

The present disclosure provides a communication device, including: an acquisition unit configured to acquire first control information and second control information relating to a plurality of resources specified by a frequency and time available for data transmission; and a control unit configured to perform control in such a manner that data is transmitted to a transmission target after a resource is arbitrarily selected from the plurality of resources on the basis of the first control information, in which the control unit controls selection of the resource from among the plurality of resources on a basis of the second control information.

The present disclosure also provides a communication device, including: a notification unit configured to notify a terminal device of first control information and second control information relating to a plurality of resources specified by a frequency and time available for data transmission; and a reception unit configured to receive data transmitted from the terminal device using a resource selected from among the plurality of resources, in which selection of the resource from among the plurality of resources in the terminal device is controlled on a basis of the second control information.

The present disclosure also provides a communication method, by a computer, including: acquiring first control information and second control information relating to a plurality of resources specified by a frequency and time available for data transmission; and performing control in such a manner that data is transmitted to a transmission target after a resource is arbitrarily selected from the plurality of resources on the basis of the first control information, in which selection of the resource from among the plurality of resources is controlled on a basis of the second control information.

The present disclosure also provides a communication method, by a computer, including: notifying a terminal device of first control information and second control information relating to a plurality of resources specified by a frequency and time available for data transmission; and receiving data transmitted from the terminal device using a resource selected from among the plurality of resources, in which selection of the resource from among the plurality of resources in the terminal device is controlled on a basis of the second control information.

The present disclosure also provides a program for causing a computer to execute: acquiring first control information and second control information relating to a plurality of resources specified by a frequency and time available for data transmission; and performing control in such a manner that data is transmitted to a transmission target after a resource is arbitrarily selected from the plurality of resources on the basis of the first control information, in which selection of the resource from among the plurality of resources is controlled on a basis of the second control information.

The present disclosure also provides a program for causing a computer to execute: notifying a terminal device of first control information and second control information relating to a plurality of resources specified by a frequency and time available for data transmission; and receiving data transmitted from the terminal device using a resource selected from among the plurality of resources, in which selection of the resource from among the plurality of resources in the terminal device is controlled on a basis of the second control information.

Effects of the Invention

As described above, according to the present disclosure, it is possible to provide technology that enables flexible design depending on use cases and is capable of further improving the transmission efficiency of the entire system.

Note that the above effects are not necessarily limiting, and any one of effects described herein or other effects that can be grasped from this specification may be exerted together with the above effects or in place of the above effects.

BRIEF DESCRIPTION OF DRAWINGS

FIG. 6 is a table illustrating an example of parameter sets related to transmission signals in an NR cell.

MODE FOR CARRYING OUT THE INVENTION

Preferred embodiments of the present disclosure will be described in detail below with reference to the accompanying drawings. Note that in the present specification and the drawings, components having substantially the same functional configuration are denoted by the same symbol, thereby omitting redundant explanations.

Note that explanation will be given in the following order.
1. Exemplary Configurations
11. Exemplary System Configuration
1.2. Exemplary Configuration of Base Station
1.3 Exemplary Configuration of Terminal Device
2. Technical Features
3. Exemplary Applications
3.1. Exemplary Application in Base Station
3.2. Exemplary Application in Terminal Device
4. Conclusion

1. EXEMPLARY CONFIGURATIONS

<1.1. Exemplary System Configuration>

Figure 1:
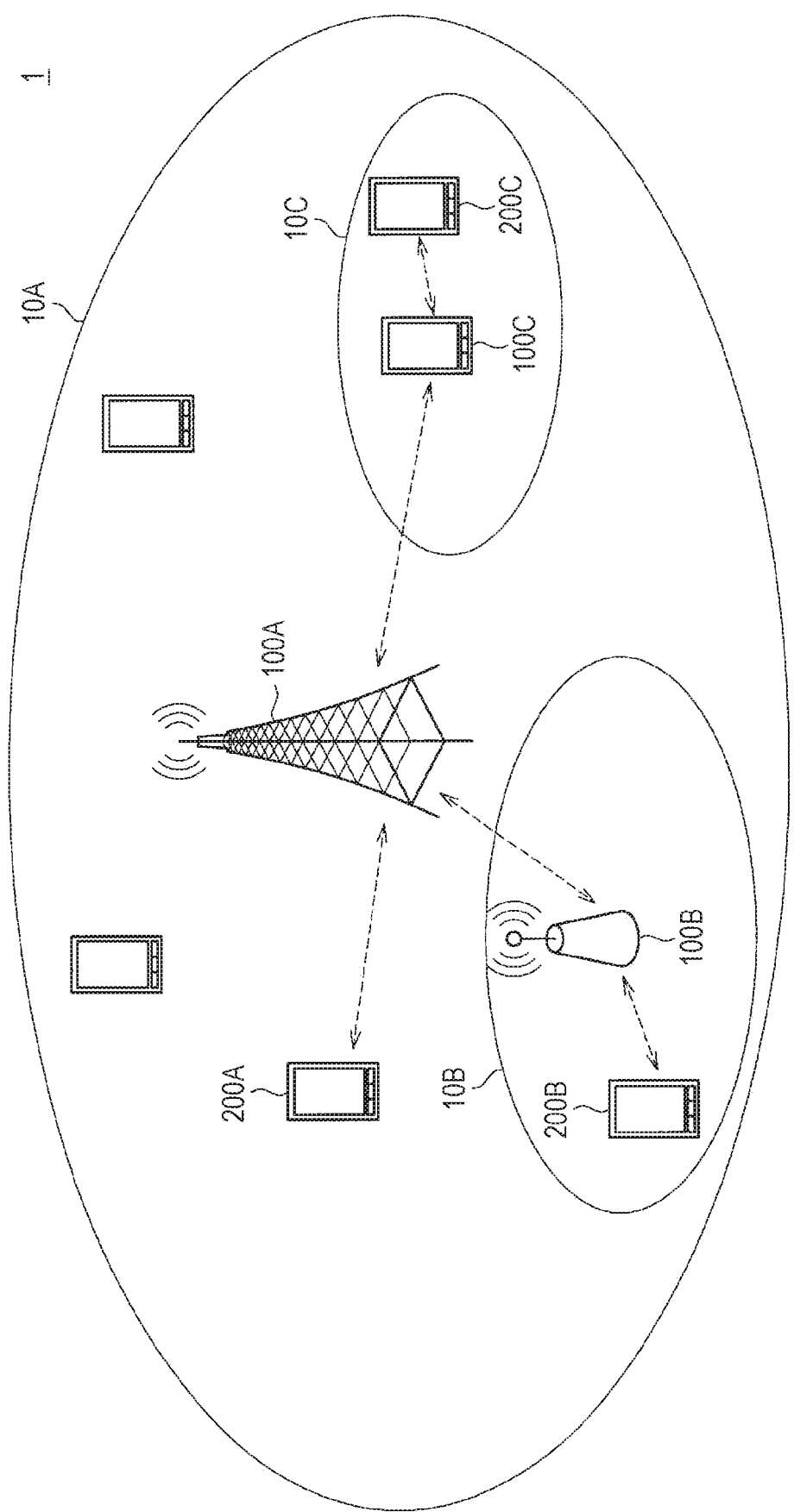
FIG. 1 is an explanatory diagram for describing an exemplary schematic configuration of a system according to an embodiment of the present disclosure.

First with reference to FIG. 1, an exemplary schematic configuration of a system 1 according to an embodiment of the present disclosure will be described. FIG. 1 is an explanatory diagram for describing an exemplary schematic configuration of the system 1 according to an embodiment of the present disclosure. As illustrated in FIG. 1, the system 1 includes wireless communication devices 100 and terminal devices 200. In this example, a terminal device 200 is also referred to as a user. The user may also be referred to as a UE. A wireless communication device 100C is also referred to as a UE-Relay. The UE here may be a UE defined in LTE or LTE-A, and the UE-Relay may be Prose UE to Network Relay discussed in the 3GPP, or may more generally mean a communication device.

(1) Wireless Communication Devices 100

The wireless communication devices 100 provide wireless communication services to devices under control thereof. For example, a wireless communication device 100A is a base station of a cellular system (or mobile communication system). The base station 100A performs wireless communication with a device (for example, a terminal device 200A) located inside a cell 10A of the base station 100A. For example, the base station 100A transmits a downlink signal to the terminal device 200A, and receives an uplink signal from the terminal device 200A.

The base station 100A is logically connected to another base station by, for example, an X2 interface, and is capable of transmitting and receiving control information and the like. The base station 100A is also logically connected to a so-called core network (not illustrated) by, for example, an S1 interface, and is capable of transmitting and receiving control information and the like. Note that communication between these devices may be relayed physically by various devices.

Here, the wireless communication device 100A illustrated in FIG. 1 is a macrocell base station, and the cell 10A is a macrocell. Meanwhile, wireless communication devices 100B and 100C are master devices operating small cells 10B and 10C, respectively. As an example, the master device 100B is a small cell base station fixedly installed. The small cell base station 100B establishes a wireless backhaul link with the macrocell base station 100A and an access link with one or more terminal devices (for example, terminal device 200B) in the small cell 10B respectively. Note that the wireless communication device 100B may be a relay node defined by 3GPP. The master device 100C is a dynamic access point (AP). The dynamic AP 100C is a mobile device that operates the small cell 10C dynamically. The dynamic AP 100C establishes a wireless backhaul link with the macrocell base station 100A and an access link with one or more terminal devices (for example, terminal device 200C) in the small cell 10C respectively. The dynamic AP 100C may be, for example, a terminal device which is mounted with hardware or software and is operable as a base station or a wireless access point. The small cell 10C in this case is a localized network (Localized Network/Virtual Cell) that is dynamically formed.

The cell 10A may be operated in accordance with any wireless communication scheme such as LTE, LTE-Advanced (LTE-A), LTE-ADVANCED PRO, GSM (registered trademark), UMTS, W-CDMA, CDMA2000, WiMAX, WiMAX 2 or IEEE 802.16.

Note that a small cell is a concept that can include various types of cells smaller than the macrocell (for example, femtocell, nanocell, picocell, or microcell). A small cell is arranged to overlap or not to overlap with a macrocell. In one example, a small cell is operated by a dedicated base station. In another example, a small cell is operated by a terminal serving as a master device temporarily operating as a small cell base station. A so-called relay node can also be regarded as one form of a small cell base station. A wireless communication device functioning as a master station of a relay node is also referred to as a donor base station. A donor base station may mean a DeNB in LTE, or may more generally mean a master station of a relay node.

(2) Terminal Devices 200

The terminal devices 200 are capable of communication in a cellular system (or mobile communication system). The terminal devices 200 perform wireless communication with a wireless communication device (for example, the base station 100A or the master device 100B or 100C) of the cellular system. For example, the terminal device 200A receives downlink signal from the base station 100A, and transmits an uplink signal to the base station 100A.

Incidentally, not only so-called UEs but also so-called low cost terminals (low cost UEs) such as MTC terminals, enhanced MTC (eMTC) terminals, or NB-IoT terminals may be employed as terminal devices 200.

(3) Supplementary Comments

Although the schematic configuration of the system 1 has been illustrated in the above, the present technology is not limited to the example illustrated in FIG. 1. For example, as a configuration of the system 1, a configuration without a master device, small cell enhancement (SCE), a heterogeneous network (HetNe), an MTC network, or the like may be employed. As another example of the configuration of the system 1, a master device may be connected to a small cell, and a cell may be established under the small cell.

<1.2. Exemplary Configuration of Base Station>

Figure 2:
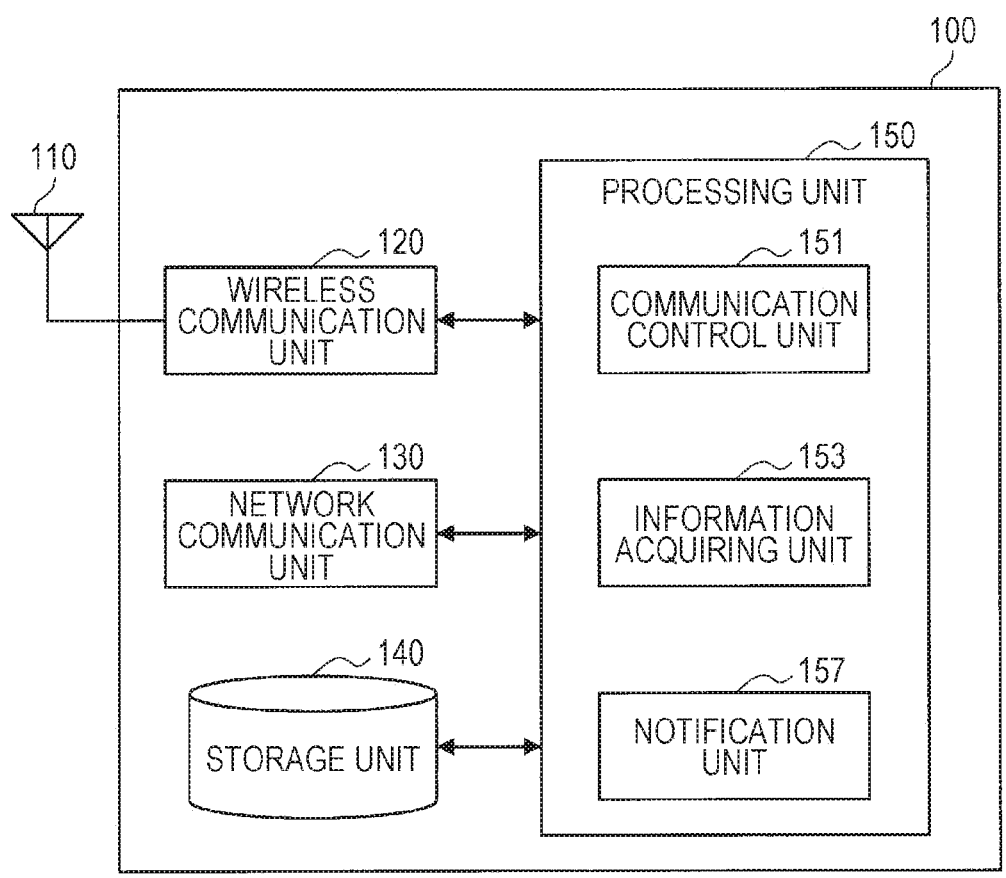
FIG. 2 is a block diagram illustrating an exemplary configuration of a base station according to the embodiment.

Next, a configuration of a base station 100 according to an embodiment of the present disclosure will be described with reference to FIG. 2. FIG. 2 is a block diagram illustrating an exemplary configuration of the base station 100 according to the embodiment of the present disclosure. Referring to FIG. 2, the base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 into space as a radio wave. The antenna unit 110 also converts a radio wave in space into a signal, and outputs the signal to the wireless communication unit 120.

(2) Wireless Communication Unit 120

The wireless communication unit 120 transmits and receives signals. For example, the wireless communication unit 120 transmits a downlink signal to a terminal device and receives an uplink signal from the terminal device.

In addition, as described above, there is a case where a terminal device operates as a relay terminal (wireless communication device 100C in FIG. 1) and relays communication between a remote terminal (terminal device 200C in FIG. 1) and a base station in the system 1 according to the present embodiment. In such a case, for example, the wireless communication unit 120 in the wireless communication device 100C that corresponds to the relay terminal may transmit and receive a sidelink signal to and from the remote terminal.

(3) Network Communication Unit 130

The network communication unit 130 transmits and receives information. For example, the network communication unit 130 transmits information to other nodes and receives information from other nodes. For example, the other nodes include other base stations and core network nodes.

Note that, as described above, there is a case where a terminal device operates as a relay terminal and relays communication between a remote terminal and a base station in the system 1 according to the present embodiment. In such a case, for example, the wireless communication device 100C that corresponds to the relay terminal may not include the network communication unit 130.

(4) Storage Unit 140

The storage unit 140 temporarily or permanently stores a program for the operation of the base station 100 and various types of data.

(5) Processing Unit 150

The processing unit 150 provides various functions of the base station 100. The processing unit 150 includes a communication processing unit 151, an information acquiring unit 153, and a notification unit 157. Note that the processing unit 150 may further include other components in addition to the above components. That is, the processing unit 150 may further perform operation other than the operation of the above components.

The operation of the communication processing unit 151, the information acquiring unit 153, and the notification unit 157 will be described in detail later.

<1.3. Exemplary Configuration of Terminal Device>

Figure 3:
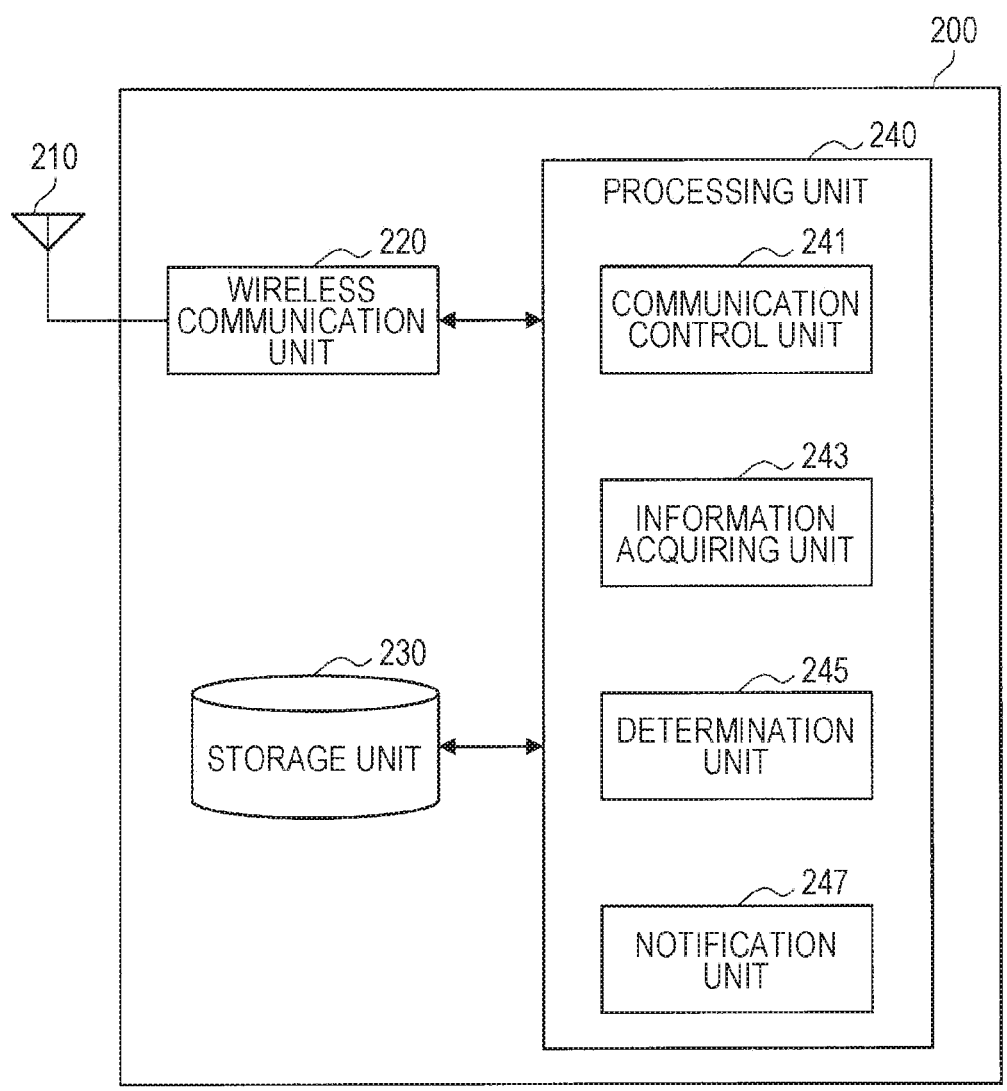
FIG. 3 is a block diagram illustrating an exemplary configuration of a terminal device according to the embodiment.

Next, with reference to FIG. 3, an exemplary configuration of a terminal device 200 according to an embodiment of the present disclosure will be described. FIG. 3 is a block diagram illustrating an exemplary configuration of the terminal device 200 according to the embodiment of the present disclosure. As illustrated in FIG. 3, the terminal device 200 includes an antenna unit 210, a wireless communication unit 220, a storage unit 230, and a processing unit 240.

(1) Antenna Unit 210

The antenna unit 210 radiates a signal output from the wireless communication unit 220 into space as a radio wave. The antenna unit 210 also converts a radio wave in space into a signal, and outputs the signal to the wireless communication unit 220.

(2) Wireless Communication Unit 220

The wireless communication unit 220 transmits and receives signals. For example, the wireless communication unit 220 receives a downlink signal from a base station and transmits an uplink signal to the base station.

Incidentally, as described above, there is a case where a terminal device operates as a relay terminal and relays communication between a remote terminal and a base station in the system 1 according to the present embodiment. In such a case, for example, the wireless communication unit 220 in the terminal device 200C operating as a remote terminal may transmit and receive a sidelink signal to and from the relay terminal.

(3) Storage Unit 230

The storage unit 230 temporarily or permanently stores a program for the operation of the terminal device 200 and various types of data.

(4) Processing Unit 240

The processing unit 240 provides various functions of the terminal device 200. For example, the processing unit 240 includes a communication processing unit 241, an information acquiring unit 243, a determination unit 245, and a notification unit 247. Note that the processing unit 240 may further include other components in addition to the above components. That is, the processing unit 240 may further perform operation other than the operation of the above components.

The operation of the communication processing unit 241, the information acquiring unit 243, the determination unit 245, and the notification unit 247 will be described in detail later.

2. TECHNICAL FEATURES

Subsequently, technical features of the system according to the embodiment of the present disclosure will be described.

<Radio Access Technology>

In the present embodiment, the base stations 100 and the terminal devices 200 each support one or more types of radio access technology (RAT). For example, the RAT includes LTE and NR. One type of RAT corresponds to one cell (component carrier). That is, in a case where multiple types of RAT are supported, these types of RAT correspond to different cells respectively. In this embodiment, a cell is a combination of downlink resources, uplink resources, and/or a sidelink. Incidentally, a cell corresponding to LTE is referred to as an LTE cell, and a cell corresponding to NR is referred to as an NR cell in the following description.

Downlink communication is communication from a base station 100 to a terminal device 200. Uplink communication is communication from a terminal device 200 to a base station 100. Sidelink communication is communication from a terminal device 200 to another terminal device 200.

Sidelink communication is defined for proximity direct detection and proximity direct communication between terminal devices. In sidelink communication, a frame structure similar to those of uplinks and downlinks can be used. Meanwhile, sidelink communication may be limited to a part (subset) of uplink resources and/or downlink resources.

The base stations 100 and the terminal devices 200 are capable of supporting communication using a set of one or more cells in a downlink, an uplink, and/or a sidelink. A set of a plurality of cells is also referred to as carrier aggregation or dual connectivity. Details of carrier aggregation and dual connectivity will be described later. Note that each cell uses a predetermined frequency bandwidth. The maximum value, the minimum value, and values that can be set in a predetermined frequency bandwidth can be specified in advance.

Figure 4:
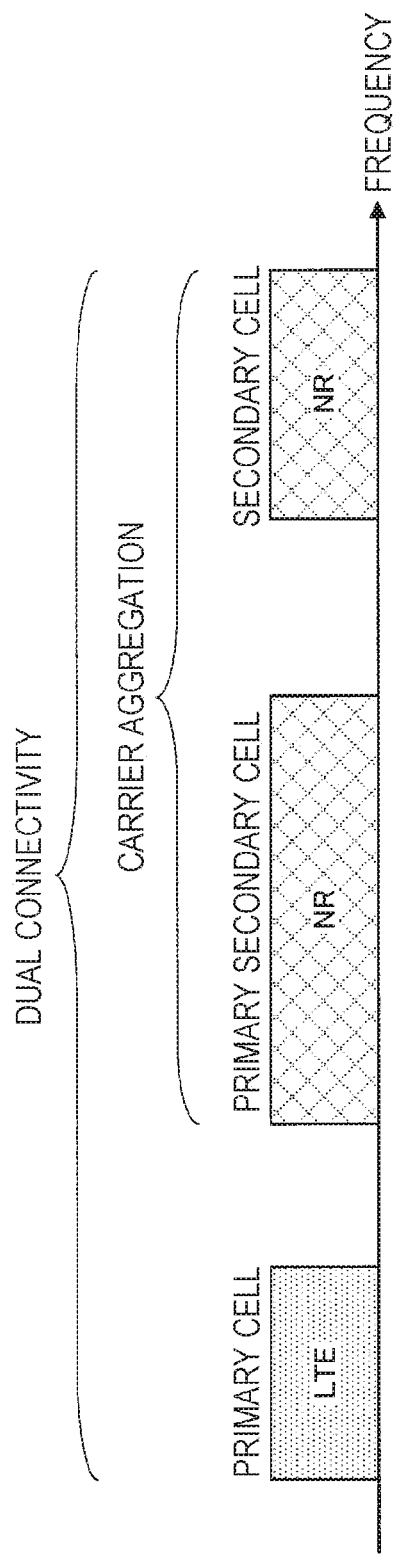
FIG. 4 is a diagram illustrating an example of setting of component carriers in the embodiment.

FIG. 4 is a diagram illustrating an example of setting of component carriers in the embodiment. In the example of FIG. 4, one LTE cell and two NR cells are set. The LTE cell is set as a primary cell. The two NR cells are respectively set as a primary secondary cell and a secondary cell. The two NR cells are integrated by carrier aggregation. The LTE cell and the NR cells are further integrated by dual connectivity. Note that the LTE cell and the NR cells may be integrated by carrier aggregation. In the example of FIG. 4, since connection by NR can be assisted by the LTE cell which is the primary cell, some functions such as functions for stand-alone communication may not be supported. The functions for stand-alone communication include functions required for initial connection.

Figure 5:
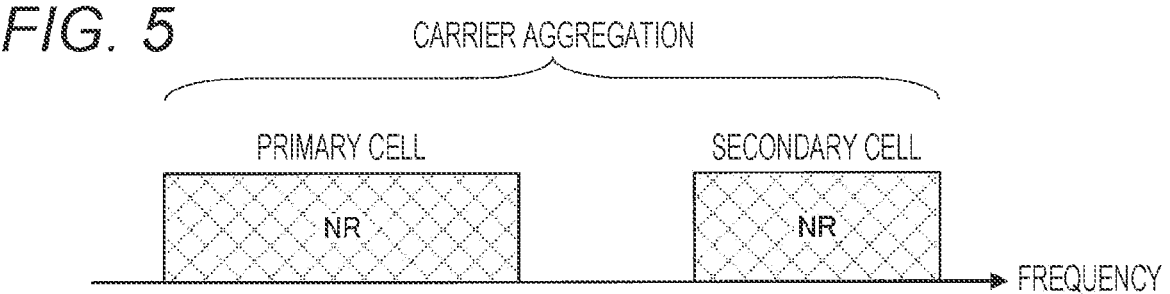
FIG. 5 is a diagram illustrating an example of setting of component carriers in the embodiment.

FIG. 5 is a diagram illustrating an example of setting of component carriers in the embodiment. In the example of FIG. 5, two NR cells are set. The two NR cells are respectively set as a primary cell and a secondary cell, and are integrated by carrier aggregation. In this case, by supporting functions for the NR cells to communicate in a stand-alone manner, assistance by an LTE cell becomes unnecessary. Note that the two NR cells may be integrated by dual connectivity.

<NR Frame Structure of Present Embodiment>

In each of the NR cells, one or more predetermined parameters are used in a predetermined length of a time slot (for example, a subframe). That is, in the NR cells, a downlink signal and an uplink signal are generated using one or more predetermined parameters in individually predetermined lengths of a time slot. In other words, in a terminal device 200, it is assumed that a downlink signal to be transmitted from a base station 100 and an uplink signal to be transmitted to the base station 100 are generated with one or more predetermined parameters in individually predetermined time lengths of a time slot. Moreover, a base station 100 can set to cause a downlink signal to be transmitted to a terminal device 200 and an uplink signal to be transmitted from the terminal device 200 to be generated with one or more predetermined parameters in individually predetermined lengths of a time slot. In a case where a plurality of predetermined parameters is used, signals generated using the predetermined parameters are multiplexed by a predetermined method. Examples of the predetermined method include frequency division multiplexing (FDM), time division multiplexing (TDM), code division multiplexing (CDM), and/or spatial division multiplexing (SDM).

As for a combination of predetermined parameters set in an NR cell, a plurality of types can be specified in advance as a parameter set.

FIG. 6 is a table illustrating an example of parameter sets related to transmission signals in an NR cell. In the example of FIG. 6, parameters related to transmission signals included in a parameter set are subframe spacing, the number of subcarriers per resource block in an NR cell, the number of symbols per subframe, and a CP length type. The CP length type is a type of the CP length used in the NR cell. For example, CP length type 1 corresponds to a normal CP in LTE, and CP length type 2 corresponds to an extended CP in LTE.

A parameter set related to a transmission signal in an NR cell can be specified individually for a downlink and an uplink. Moreover, a parameter set related to a transmission signal in an NR cell can be specified independently for a downlink and an uplink.

Figure 7:
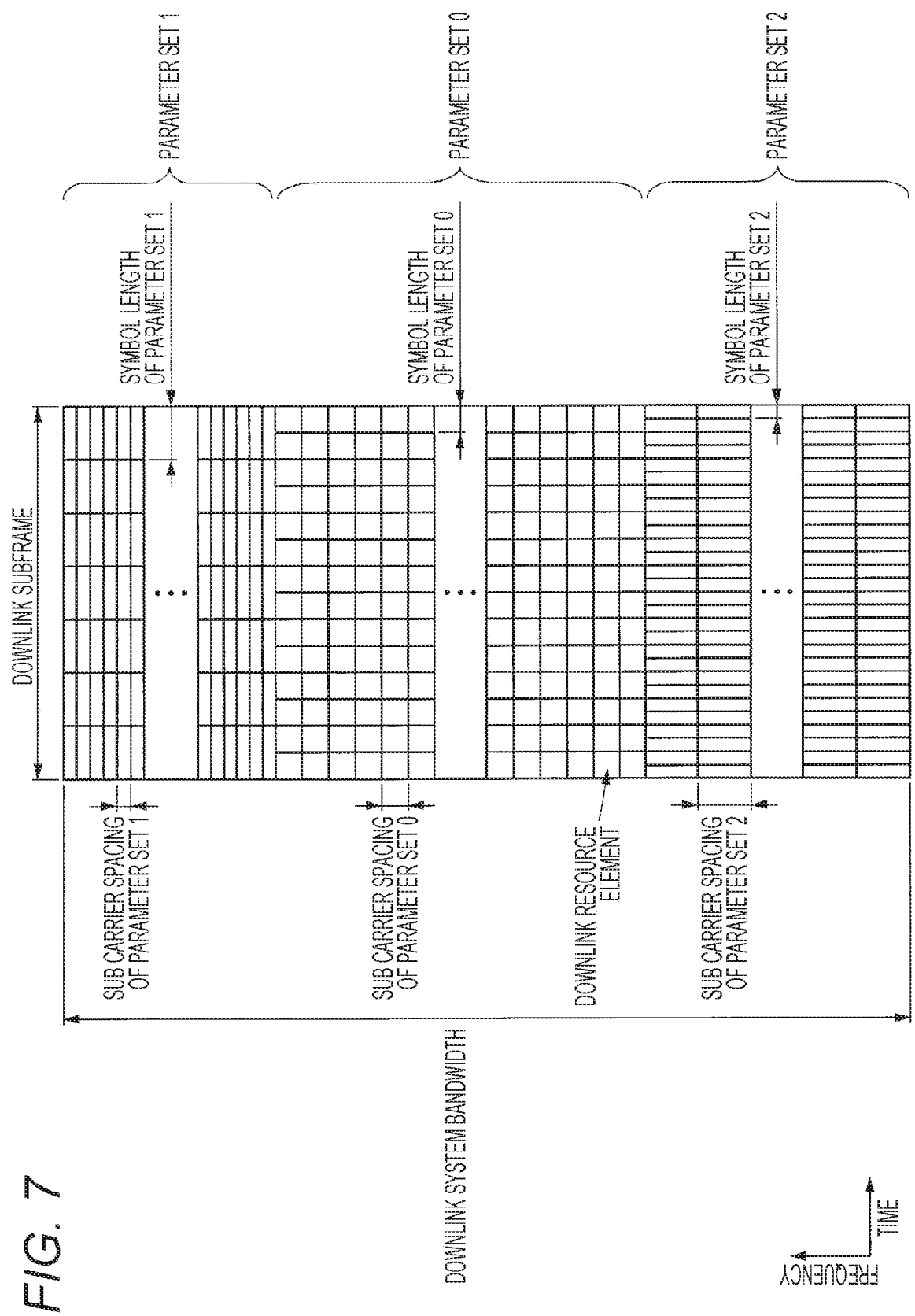
FIG. 7 is a diagram illustrating an example of an NR downlink subframe in the embodiment.

FIG. 7 is a diagram illustrating an example of an NR downlink subframe the embodiment. In the example of FIG. 7, signals generated using parameter set 1, parameter set 0, and parameter set 2 are subjected to FDM in a cell (system bandwidth). The diagram illustrated in FIG. 7 is also referred to as a downlink resource grid for NR. A base station 100 can transmit an NR physical downlink channel and/or NR physical downlink signals in a downlink subframe to a terminal device 200. A terminal device 200 can receive an NR physical downlink channel and/or NR physical downlink signals in a downlink subframe from a base station 100.

Figure 8:
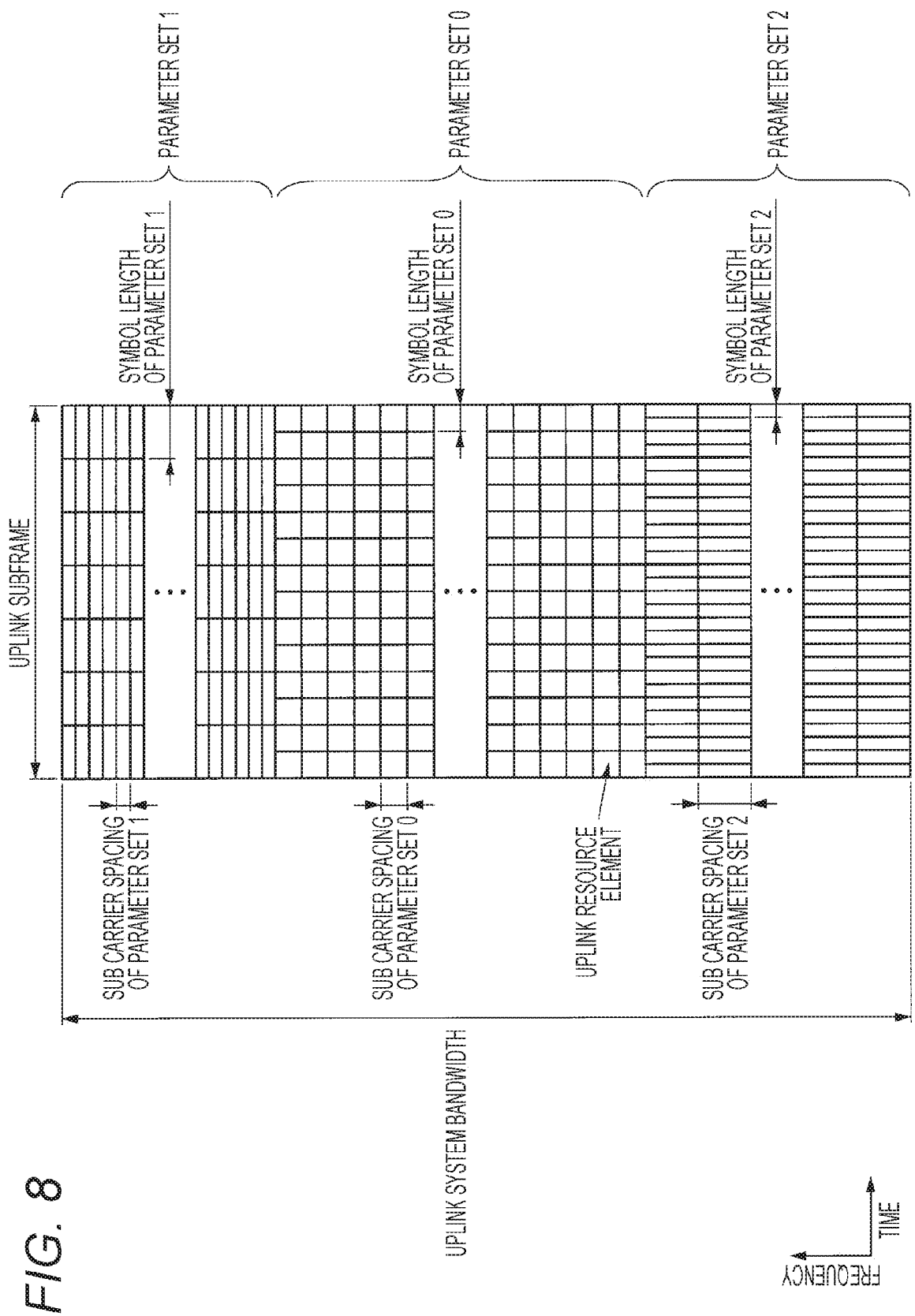
FIG. 8 is a diagram illustrating an example of an NR uplink subframe in the embodiment.

FIG. 8 is a diagram illustrating an example of an NR uplink subframe in the embodiment. In the example of FIG. 8, signals generated using parameter set 1, parameter set 0, and parameter set 2 are subjected to FDM in a cell (system bandwidth). The diagram illustrated in FIG. 7 is also referred to as an uplink resource grid for NR. A base station 100 can transmit an NR physical uplink channel and/or NR physical uplink signals in an uplink subframe to a terminal device 200. A terminal device 200 can receive an NR physical uplink channel and/or NR physical uplink signals in an uplink subframe from a base station 100.

<Signaling of Control Information in Present Embodiment>

A base station 100 and a terminal device 200 each can use various approaches for signaling (notification, announcement, setting) of control information. Signaling of control information can be performed at various layers. Signaling of control information includes physical layer signaling that is signaling through a physical layer, RRC signaling that is signaling through an RRC layer, and MAC signaling that is signaling through a MAC layer. The RRC signaling is either dedicated RRC signaling for notifying control information unique to a terminal device 200, or common RRC signaling for notifying control information unique to a base station 100. Signaling used by upper layers with respect to the physical layer, such as RRC signaling and MAC signaling, is also referred to as upper layer signaling.

RRC signaling is implemented by signaling RRC parameters. MAC signaling is implemented by signaling a MAC control element. Physical layer signaling is implemented by signaling downlink control information (DCI) or uplink control information (UCI). RRC parameters and MAC control elements are transmitted using PDSCH or PUSCH. DCI is transmitted using PDCCH or EPDCCH. UCI is transmitted using PUCCH or PUSCH. RRC signaling and MAC signaling are used for signaling semi-static control information, and thus is also called semi-static signaling. Physical layer signaling is used for signaling dynamic control information, and thus is also referred to as dynamic signaling. DCI is used for PDSCH scheduling, PUSCH scheduling, or the like. UCI is used for CSI reporting, HARQ-ACK reporting, and/or a scheduling request (SR), or the like.

<Details of Multicarrier Transmission of Present Embodiment>

A plurality of cells may be set for a terminal device 200, and the terminal device 200 can perform multicarrier transmission. Communication in which the terminal device 200 uses a plurality of cells is referred to as carrier aggregation (CA) or dual connectivity (DC). The contents described in the present embodiment may be applied to all or a part of the plurality of cells set for the terminal device 200. A cell set for the terminal device 200 is also referred to as a serving cell.

In CA, a plurality of serving cells to be set include one primary cell (PCell) and one or more secondary cells (SCells). One primary cell and one or more secondary cells are set for the terminal device 200 supporting the CA.

A primary cell is a serving cell on which an initial connection establishment procedure has been performed, a serving cell on which a connection re-establishment procedure has been initiated, or a cell instructed to be a primary cell in a handover procedure. The primary cell operates at a primary frequency. The secondary cells may be set after the connection is established or reconstructed. The secondary cells operate at a secondary frequency. Note that the connection is also referred to as RRC connection.

DC is operation in which a predetermined terminal device 200 consumes radio resources provided by at least two different network points. The network points include a master base station device (Master eNB: MeNB) and a secondary base station device (Secondary eNB: SeNB). Dual connectivity is for the terminal device 200 to perform RRC connection at least at two network points, in dual connectivity, two network points may be connected by non-ideal backhaul.

In DC, a base station 100 connected to at least an S1-mobility management entity (MME) and serving as a mobility anchor of a core network is referred to as a master base station device. In addition, a base station 100 that is not the master base station device but provides additional radio resources to the terminal device 200 is referred to as a secondary base station device. A group of serving cells associated with the master base station device is also referred to as a master cell group (MCG). A group of serving cells associated with the secondary base station device is also referred to as a secondary cell group (SCG).

In DC, a primary cell belongs to an MCG Moreover, in an SCG, a secondary cell corresponding to the primary cell is referred to as a primary secondary cell (PSCell). In a PSCell (base station device configuring the pSCell), functions (capability, performance) equivalent to the PCell (base station device configuring the PCell) may be supported. Alternatively, in a PSCell, only some of the functions of the PCell may be supported. For example, a PSCell may support a function to perform PDCCH transmission using a search space different from a CSS or a USS. Moreover, the PSCell may always be activated. Furthermore, the PSCell is capable of receiving PUCCH.

In DC, radio bearers (data radio bearers (DRBs) and/or signaling radio bearers (SRBs)) may be allocated individually for the MeNB and the SeNB. A duplex mode may be set individually for the MCG (PCell) and the SCG (PSCell), The MCG (PCell) and the SCG (PSCell) may not be synchronized with each other. A plurality of parameters for timing adjustment (timing advance group (TAG)) may be set independently for the MCG (PCell) and the SCG (PSCell). In dual connectivity, the terminal device 200 transmits UCI corresponding to a cell in the MCG only by the MeNB (PCell), and transmits UCI corresponding to a cell in the SCG only by the SeNB (pSCell). In each case of UCI transmission, transmission method using PUCCH and/or PUSCH is applied in each cell group.

PUCCH and PBCH (MIB) are transmitted only by a PCell or a PSCell. In addition, PRACH is transmitted only by a PCell or a PSCell unless a plurality of timing advance groups (TAGs) is set among cells in a CG.

In a PCell or a PSCell, semi-persistent scheduling (SPS) or discontinuous transmission (DRX) may be performed. In a secondary cell, the same DRX as that in a PCell or a PSCell of the same cell group may be performed.

In a secondary cell, information/parameters related to MAC configuration are basically shared with a PCell or a PSCell of the same cell group. Some parameters may be set for each secondary cell. Some timers or counters may be applied only to PCells or PSCells.

In CA, cells to which the TDD scheme is applied and cells to which the FDD scheme is applied may be aggregated. In a case where cells to which TDD is applied and cells to which FDD is applied are aggregated, the present disclosure can be applied to either the cells to which TDD is applied or the cells to which FDD is applied.

The terminal device 200 transmits, to the base station 100, information indicating combinations of bands for which CA is supported by the terminal device 200. The terminal device 200 transmits, to the base station 100, information indicating, for each of the combinations of bands, whether or not simultaneous transmission and reception in the plurality of serving cells in different multiple bands are supported.

<Grant-Free Based Transmission>

Grant-free based transmission means that a terminal device 200 uses resources partitioned by an appropriate frequency axis and an appropriate time axis to perform transmission without receiving resource allocation (Grant) from a base station 100. This is mainly for saving power of the terminal device 200 or low-delay communication through reduction of the signaling overhead. In the conventional grant-based transmission, a base station 100 notifies a terminal device 200 of resources to be used in downlink/uplink, thereby enabling communication without causing a resource conflict with other terminal devices 200; however, on the other hand, this notification results in a signaling overhead.

Figure 9:
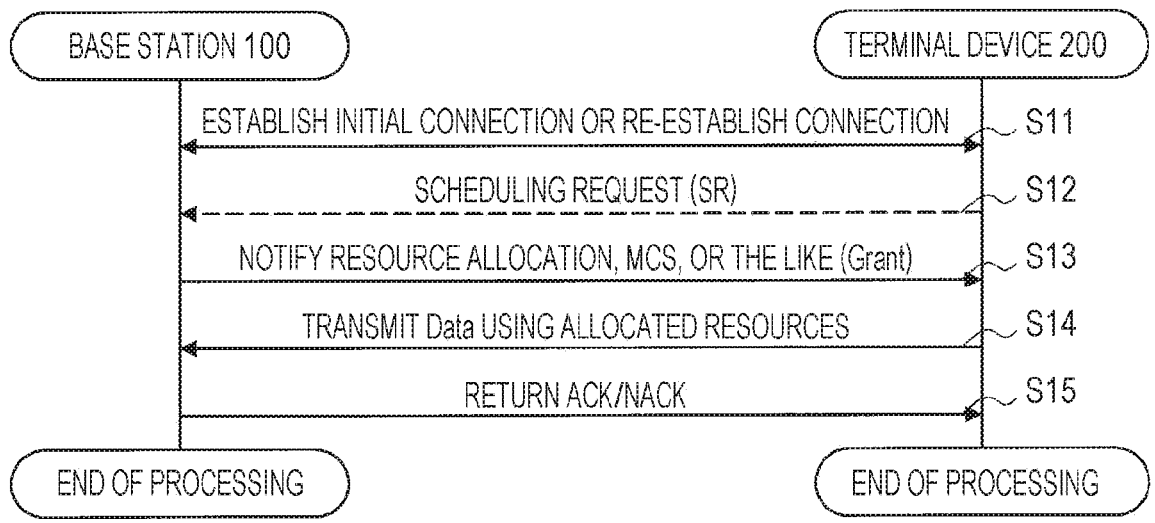
FIG. 9 is a flow chart illustrating an example of grant-based transmission.

FIG. 9 is a flowchart illustrating an example of grant-based transmission. For example in the case of grant-based transmission as illustrated in FIG. 9, after the initial connection is established or connection is re-established between a base station 100 and a terminal device 200 (step S11), the terminal device 200 transmits a scheduling request (SR) to the base station 100 (step S12). The base station 100 notifies resource allocation, MCS, or the like to the terminal device 200 (Grant) (step 13). The terminal device 200 transmits data to the base station 100 using the allocated resources (step 14). The base station 100 returns ACK or NACK to the terminal device 200 (step 15).

Since the terminal device 200 transmits the data using resources, MCS, or the like allocated by the base station 100, a signaling overhead for step S13 (and in some cases for step S12 as well) occurs. Such a signaling overhead is reduced in grant-free based transmission.

Figure 10:
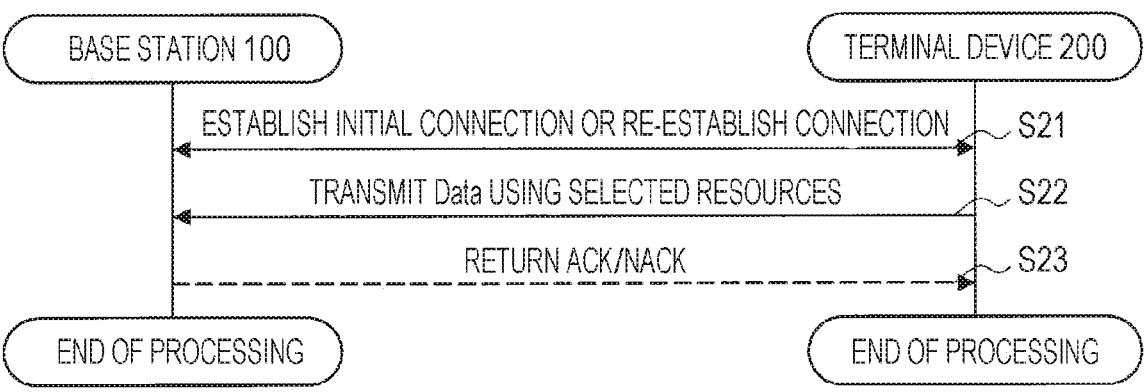
FIG. 10 is a flow chart illustrating an example of grant-free based transmission.

FIG. 10 is a flow chart illustrating an example of grant-free based transmission. For example in the case of grant-free based transmission as illustrated in FIG. 10, after the initial connection is established or connection is re-established between a base station 100 and a terminal device 200 (step S21), the terminal device 200 transmits data to the base station 100 using resources arbitrarily selected (step 22). The base station 100 returns ACK or NACK to the terminal device 200 (step 23).

In the case of grant-free based transmission as illustrated in FIG. 10, in order to perform communication in which the processing in steps S12 and S13 in FIG. 9 is reduced, grant-free based transmission without resource allocation notifications is considered as a leading technology candidate in power consumption reduction or low-delay communication required for next-generation communication. The terminal device 200 may select transmission resources in the grant-free based transmission from all bands available, or may select from among a predetermined resource pool. The resource pool may be statically determined as specifications. Alternatively, the resource pool may be designated when connection between the base station 100 and the terminal device 200 is established. Further alternatively, the resource pool may be semi-statically or dynamically set by system information, DCI, or the like.

<Exemplary Resource Allocation at Time of Grant-Free Transmission>

Subsequently, exemplary resource allocation at the time of grant-free transmission will be described. As described above, it is conceivable that resources used in grant-free transmission may be defined in specifications or set semi-statically when the terminal is connected. However, it is conceivable that there are cases in which grant-free transmission is inappropriate or cases in which it is desirable that grant-free transmission not be performed even when resources are designated as being available for grant-free transmission. These are determined by control information related to resources for grant-free transmission that are set semi-statically (hereinafter also referred to as "first control information") and another piece of control information different from the above control information (hereinafter also referred to as "second control information"). The above cases are described in details below <Exemplary Control Based on Explicit Notification>

First, an example will be described in which the operation relating to grant-free transmission, such as whether or not to perform the grant-free transmission or control of resources used for the grant-free transmission, is controlled by explicitly notifying, as second control information, the frequency or time information of the grant-free transmission resources. Note that in the case of explicitly notifying information relating to grant-free transmission resources as the second control information, the notification is also referred to as "explicit notification".

For example, shared control information provided from a base station 100 to a terminal device 200 as the second control information may include the frequency or time information of grant-free transmission resources. In this case, the terminal device 200 determines grant-free transmission resources on the basis of both the information of grant-free transmission resources semi-statically notified as the first control information and the second control information.

Figure 11:
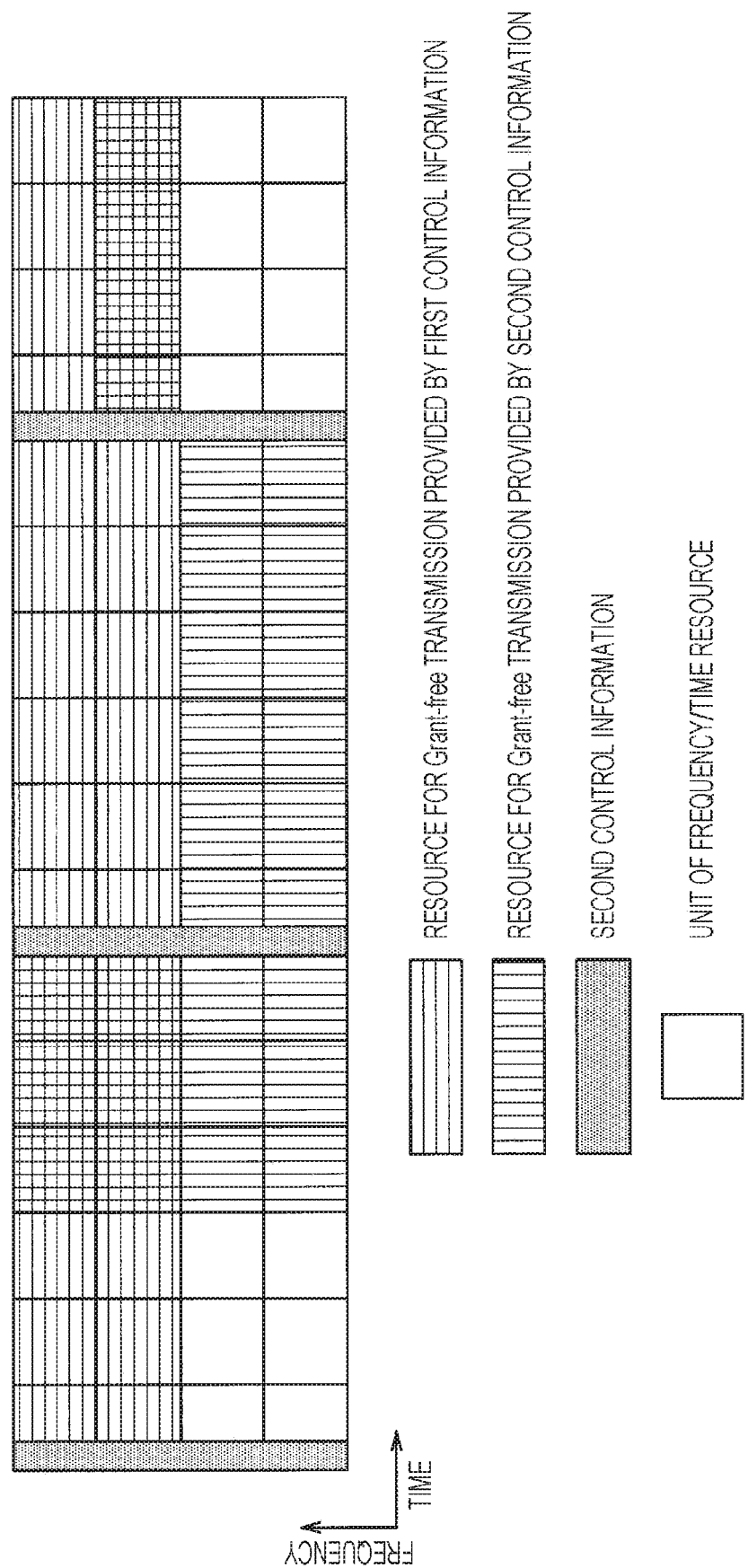
FIG. 11 is an explanatory diagram for describing an example of resource allocation in the system according to the embodiment.

For example, FIG. 11 is an explanatory diagram for describing an example of resource allocation in the system according to the present embodiment, and illustrates an example of resource allocation based on an explicit notification at the time of grant-free transmission.

Specifically, first, information related to grant-free transmission resources (hereinafter, also referred to as "grant-free transmission resource information") semi-statically notified as first control information from a base station 100 provides information of all resources available to the terminal device 200 for grant-free transmission. Note that, in the example illustrated in FIG. 11, the range hatched with horizontal lines corresponds to the range of the grant-free transmission resources provided by first control information.

Incidentally, the second control information is not required to cover only a single terminal device 200, but may be provided to a plurality of terminal devices 200 (for example, all terminal devices 200 in a cell, a plurality of terminal devices 200 belonging to a predetermined group, etc.). That is, the grant-free transmission resource information provided by the second control information may not be limited to only one terminal device 200 but also be provided to another terminal device 200. For example, in the example illustrated in FIG. 11, the range hatched with vertical lines corresponds to the range of grant-free transmission resources provided by second control information.

Under the control as described above, the terminal device 200 can use, for grant-free transmission, resources that overlap between the first control information and the second control information among grant-free resources provided on the basis of each of the first control information and the second control information. For example, in the case of the example illustrated in FIG. 11, the resources included in the range in which the horizontally hatched range and the vertically hatched range overlap with each other are used as grant-free transmission resources.

By using the first control information and the second control information in combination in the above manner, for example, the amount of control information is reduced, and it is facilitated to manage the number of terminal devices 200 accommodated and to dynamically change grant-free resources.

Specifically, it is also possible to notify grant-free transmission resources dynamically and individually to each terminal device 200; however, the overhead corresponding to the amount of control channels increases in proportion to the number of terminal devices 200 since it is necessary to notify control information as many times as the number of terminal devices 200 accommodated. Meanwhile, provision of grant-free transmission resources as shared control information eliminates the need to individually notify each terminal device 200 of control information, and thus it becomes possible to reduce the overhead of the amount of control channels. However, in the case where grant-free transmission resources are notified only by shared control information, all the terminal devices 200 are to use the transmission resources notified by the shared control information, and thus there may be a higher probability that transmission resources compete among multiple terminal devices 200.

In view of the above situation, it becomes possible to adjust the probability of conflict among transmission resources in the system according to the present embodiment by separating grant-free transmission resources for each terminal device 200 in advance (for example, for each group including one or more terminal devices 200) by first control information. Here, the second control information may be notified for each group of grant-free resources provided by the first control information, or may be notified to all users who perform grant-free transmission. For example in the example illustrated in FIG. 11, terminal devices 200 that perform grant-free transmission are divided into a plurality of groups, and the second control information (that is, the shared control information) is notified to each of the groups, thereby separating grant-free transmission resources for each of the groups.

Note that examples of information notified as the second control information include information indicated by (1) to (4) below.

(1) Frequency Mapping Information
(2) Time Mapping Information
(3) Frequency And Time Mapping Information
(4) Area Information Divided Within Grant-Free Transmission Resources Hereinbelow, exemplary resource allocation in cases where each piece of information exemplified as the above (1) to (4) is notified as second control information will be explained with a specific example with reference to FIGS. 12 to 17. Note that the unit of frequency and time resources represented by one block may be read as any of the followings in each of the frequency direction and the time direction in FIGS. 12 to 17.

Frequency direction: subcarrier, sub-band, band, resource element (RE), or resource block (RB)

Time direction: symbol, mini slot, slot, subframe, frame, or radio frame (1) Frequency Mapping Information A base station 100 may notify a terminal device 200 of available frequency mapping information. For example, FIG. 12 is an explanatory diagram for explaining an example of resource allocation in the system according to the present embodiment, and illustrates an example in which frequency mapping information is notified as second control information.

Figure 12:
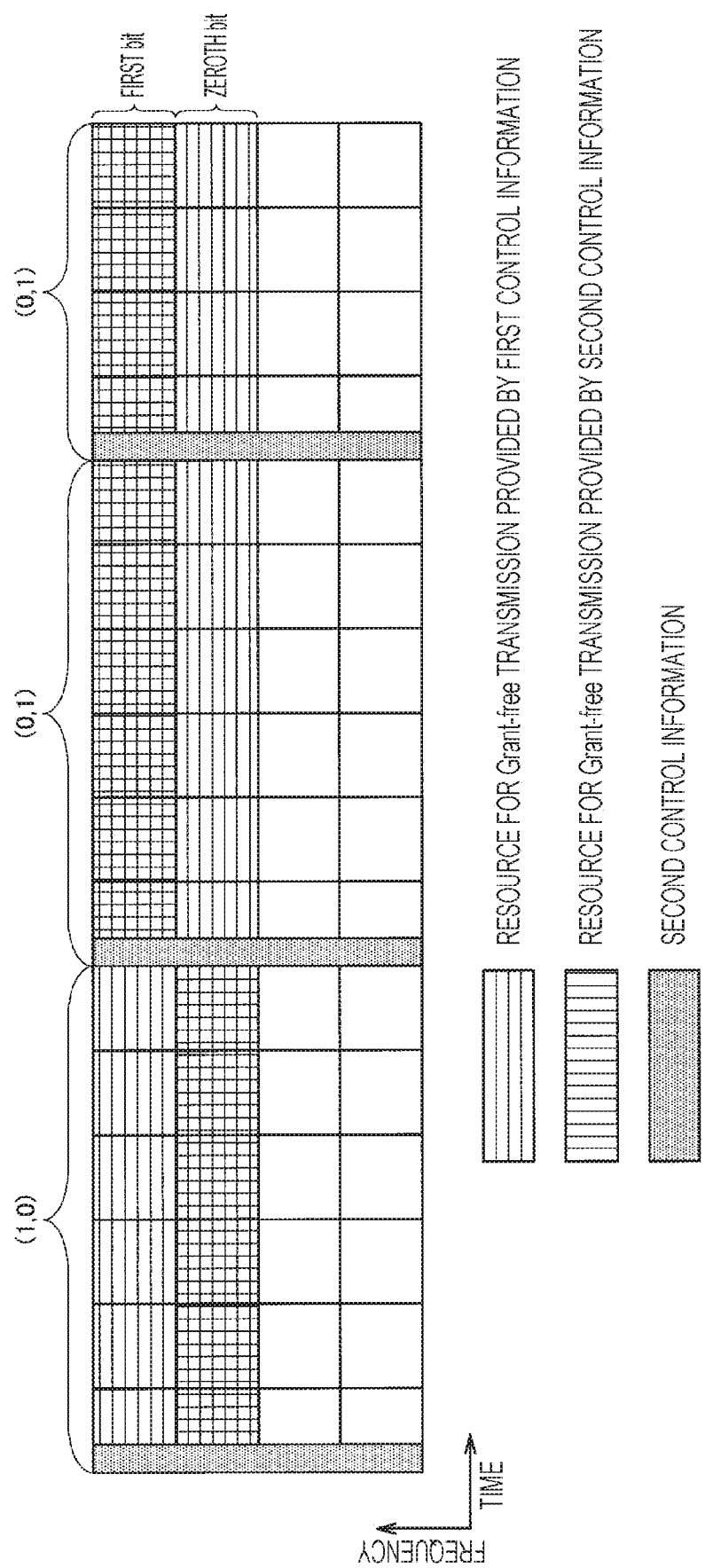
FIG. 12 is an explanatory diagram for describing another example of resource allocation in the system according to the embodiment.

Specifically, FIG. 12 illustrates an example in which two RBs are allocated in the frequency direction and six RBs are allocated in the time direction as grant-free transmission resources provided by first control information. The terminal device 200 acquires second control information provided by the base station 100 before performing grant-free transmission. For example in the case where grant-free transmission resource information included in the second control information is (1, 0), this means that RBs having a value of 1 that is set to the bit is available among the RBs of the corresponding frequency.

Of course the example illustrated in FIG. 12 is merely an example, and the meaning of values set to each bit is not necessarily limited to the example illustrated in FIG. 12. That is, it may mean that RBs, a value of which set to the bit is 0, are available among RBs of the corresponding frequency in the grant-free transmission resource information included in the second control information.

Note that setting based on the grant-free transmission resource information included in the second control information may stay effective, for example, until next provision of second control information or may be effective only for the RBs that are provided with the second control information.

(2) Time Mapping Information

A base station 100 may notify a terminal device 200 of available time mapping information. For example, FIG. 13 is an explanatory diagram for explaining another example of resource allocation in the system according to the present embodiment, and illustrates an example in which time mapping information is notified as second control information.

Figure 13:
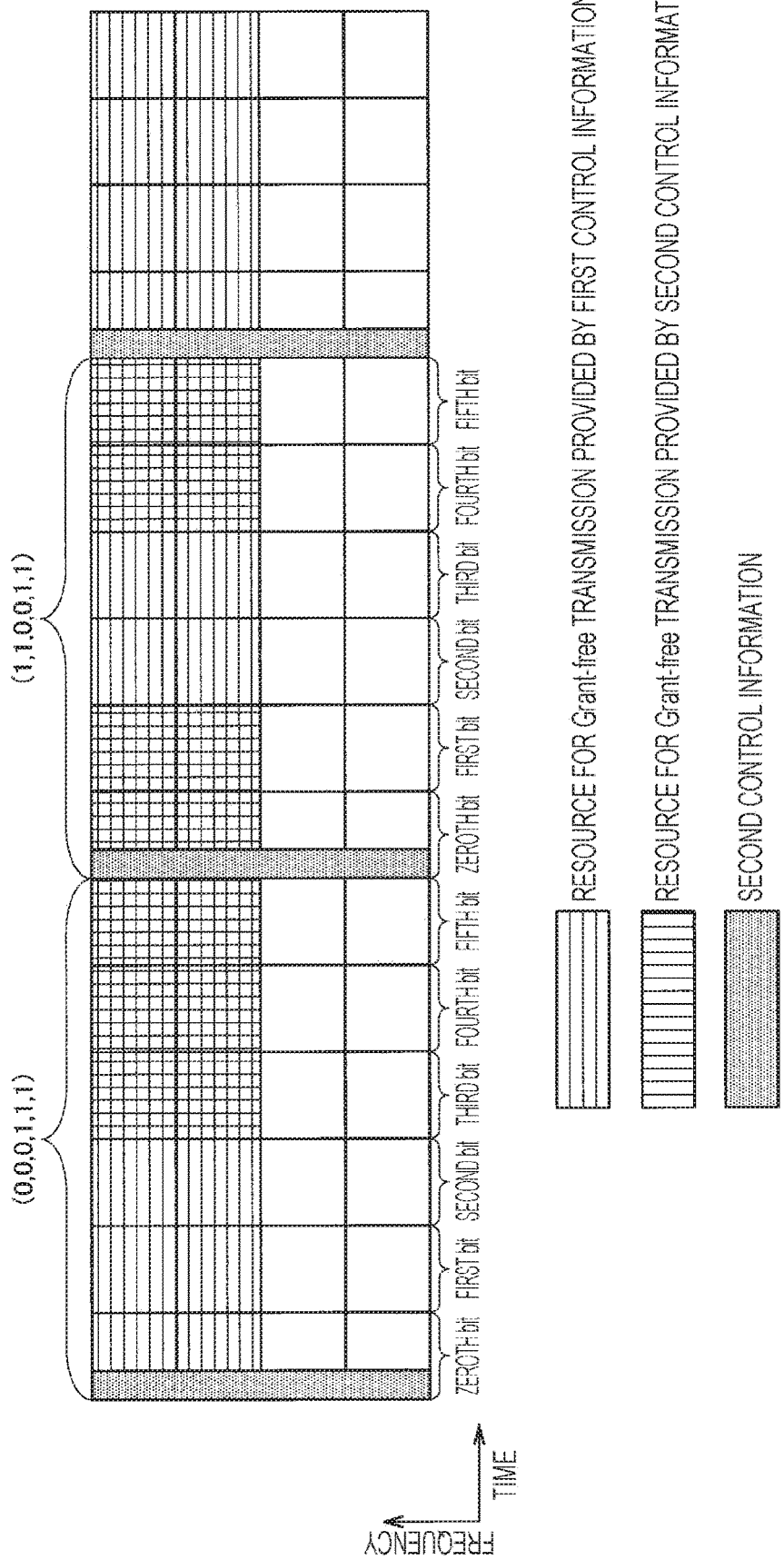
FIG. 13 is an explanatory diagram for describing still another example of resource allocation in the system according to the embodiment.

Specifically, FIG. 13 illustrates an example in which two RBs are allocated in the frequency direction and six RBs are allocated in the time direction as grant-free transmission resources provided by first control information. The terminal device 200 acquires second control information provided by the base station 100 before performing grant-free transmission. For example in the case where grant-free transmission resource information included in the second control information is (0, 0, 0, 1, 1, 1), this means that RBs having a value of 1 that is set to the bit is available among the RBs of the corresponding time.

Of course the example illustrated in FIG. 13 is merely an example, and the meaning of values set to each bit is not necessarily limited to the example illustrated in FIG. 13. That is, it may mean that RBs, a value of which set to the bit is 0, are available among RBs of the corresponding time in the grant-free transmission resource information included in the second control information.

Note that setting based on the grant-free transmission resource information included in the second control information may stay effective, for example, until next provision of second control information.

(3) Frequency And Time Mapping Information

A base station 100 may notify a terminal device 200 of available frequencies and time mapping information. For example, FIG. 14 is an explanatory diagram for explaining another example of resource allocation in the system according to the present embodiment, and illustrates an example in which frequency and time mapping information is notified as second control information.

Figure 14:
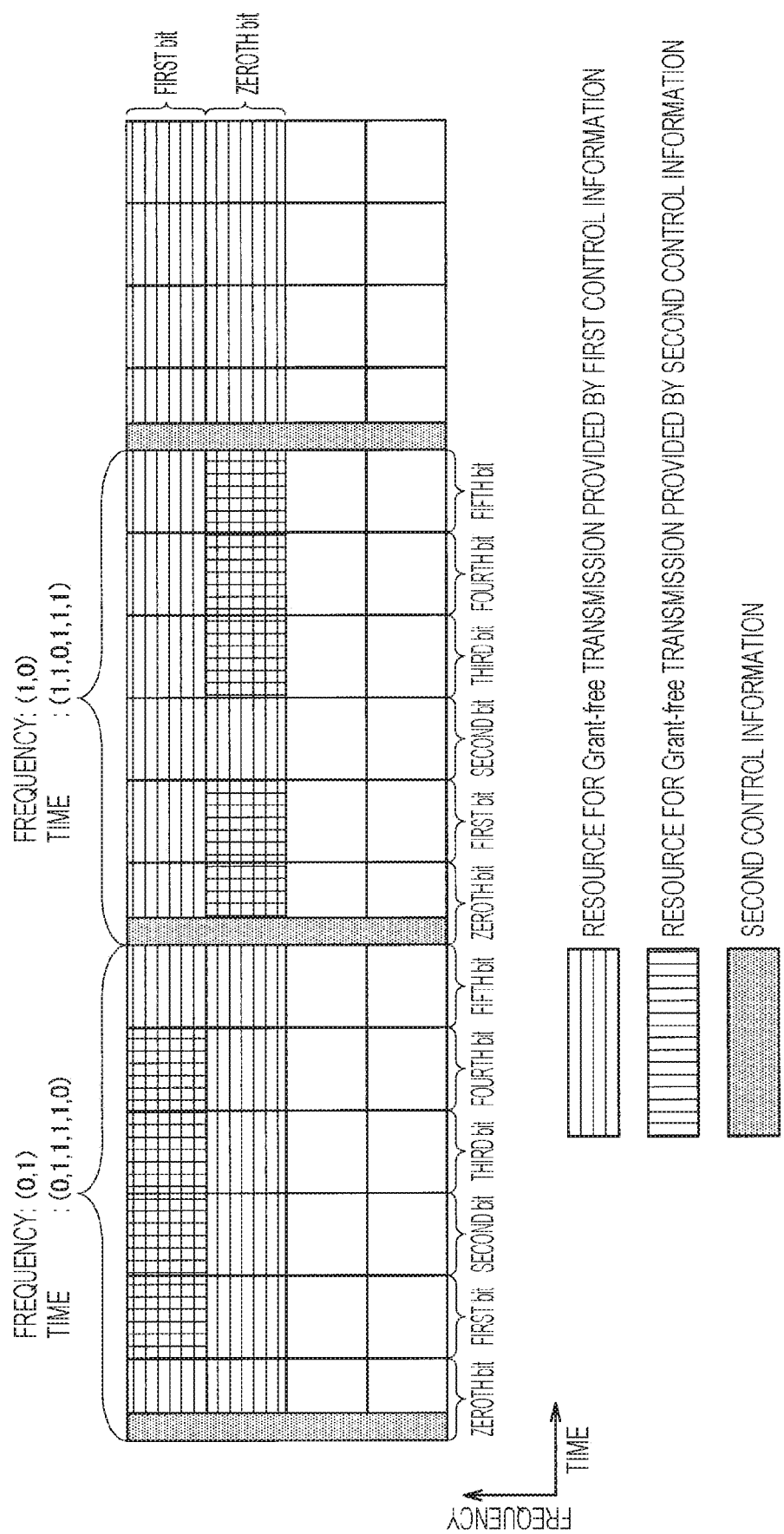
FIG. 14 is an explanatory diagram for describing yet another example of resource allocation in the system according to the embodiment.

Specifically, FIG. 14 illustrates an example in which two RBs are allocated in the frequency direction and six RBs are allocated in the time direction as grant-free transmission resources provided by first control information. The terminal device 200 acquires second control information provided by the base station 100 before performing grant-free transmission. For example in the case where grant-free transmission resource information included in the second control information indicates frequency (0, 1) and time (0, 1, 1, 1, 1, 0), this means that RBs having a value of 1 that is set to the bit is available among the RBs of the corresponding frequency and time.

Of course the example illustrated in FIG. 14 is merely an example, and the meaning of values set to each bit is not necessarily limited to the example illustrated in FIG. 14. That is, it may mean that RBs, a value of which set to the bit is 0, are available among RBs of the corresponding frequencies and time in the grant-free transmission resource information included in the second control information.

Note that setting based on the grant-free transmission resource information included in the second control information may stay effective, for example, until next provision of second control information.

(4) Area Information Divided Within Grant-Free Transmission Resources

A base station 100 may divide an area defined by a frequency and time, to which each resource for grant-free transmission available to a terminal device 200 is allocated, into a plurality of areas, and notify information indicating the divided individual areas as area information. For example, FIG. 15 is an explanatory diagram for explaining another example of resource allocation in the system according to the present embodiment, and illustrates an example in which the area information is notified as second control information.

Figure 15:
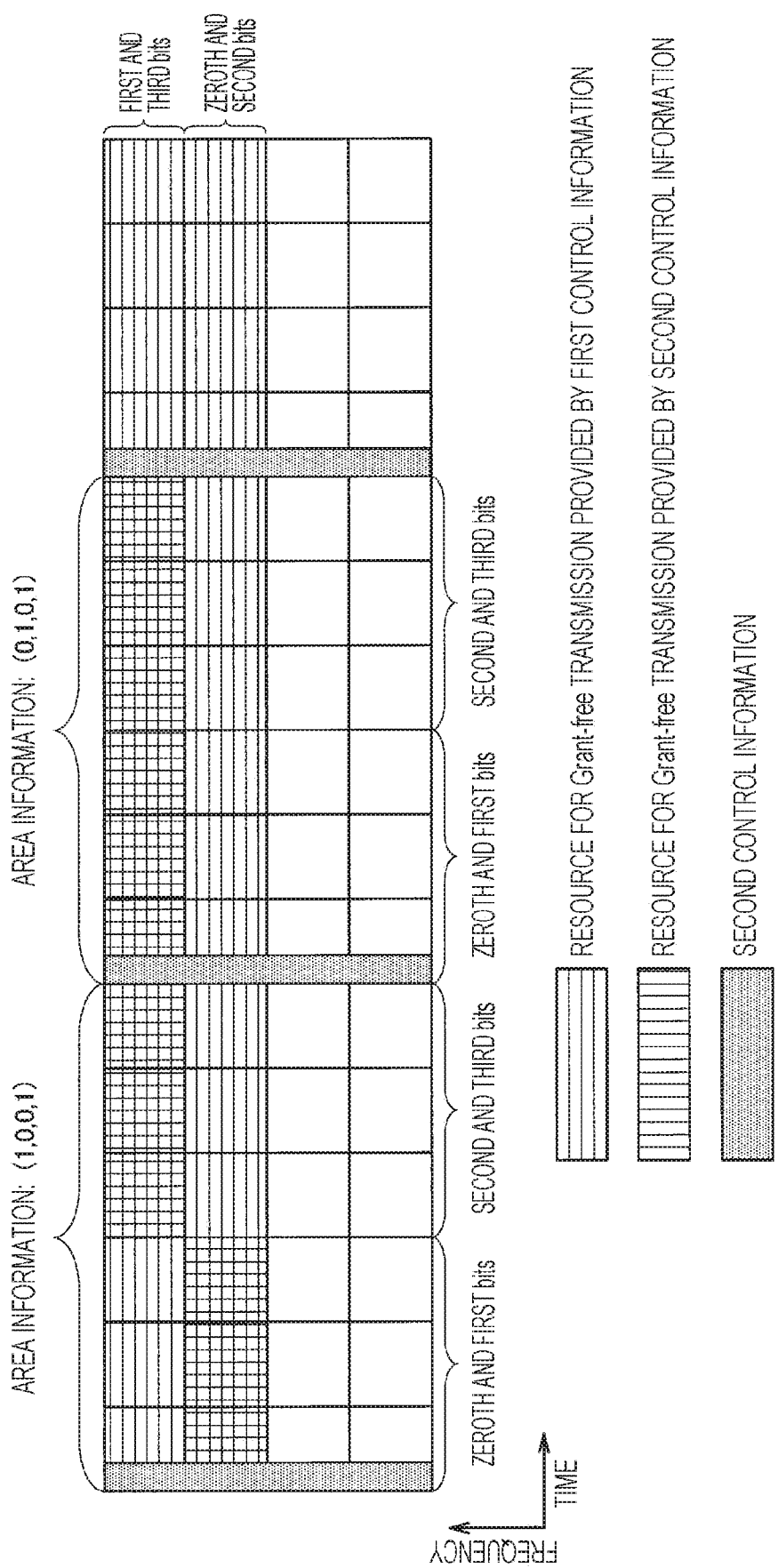
FIG. 15 is an explanatory diagram for describing still yet another example of resource allocation in the system according to the embodiment.

Specifically, FIG. 15 illustrates an example in which two RBs are allocated in the frequency direction and six RBs are allocated in the time direction as grant-free transmission resources provided by first control information. As described above, in this embodiment, an area defined by a frequency and time, to which each resource for grant-free transmission is allocated, is divided into a plurality of areas, and the divided individual areas are allocated to information bits provided by the second control information, and thereby available areas are notified.

For example, in the example illustrated in FIG. 15, the example is illustrated in which an area to which grant-free transmission resources are allocated is divided into four areas, and available areas among the four areas are notified. The terminal device 200 acquires second control information provided by the base station 100 before performing grant-free transmission. In the example illustrated in FIG. 15, grant-free transmission resource information included in the second control information is configured as 4-bit information, in which a 0th bit indicates the lower left area, a 1st bit indicates the upper left area, a 2nd bit indicates the lower right area, and a 3rd bit indicates the upper right area. For example, in a case where the grant-free transmission resource information included in the second control information indicates (1, 0, 0, 1), since the 0th bit and the 3rd bit are 1, the lower left and upper right areas are available.

Of course the example illustrated in FIG. 15 is merely an example, and the meaning of values set to each bit is not necessarily limited to the example illustrated in FIG. 15. That is, it may mean that RBs, a value of which set to the bit is 0, are available among RBs of the corresponding areas in the grant-free transmission resource information included in the second control information.

(Control to Enable/Disable Grant-Free Transmission)

Subsequently, an example will be described in which whether or not grant-free transmission is possible is controlled by notification. Specifically, a mechanism that can be effectively used in use cases other than application to grant-free transmission is conceivable such as use cases in which even the resources allocated as grant-free transmission resources are changed to be used in grant-based communication or used in communication that requires urgency. As a more specific example, it is conceivable that resources allocated for grant-free transmission are temporarily changed to be unavailable for grant-free transmission and that those resources are used for other transmission applications.

Figure 16:
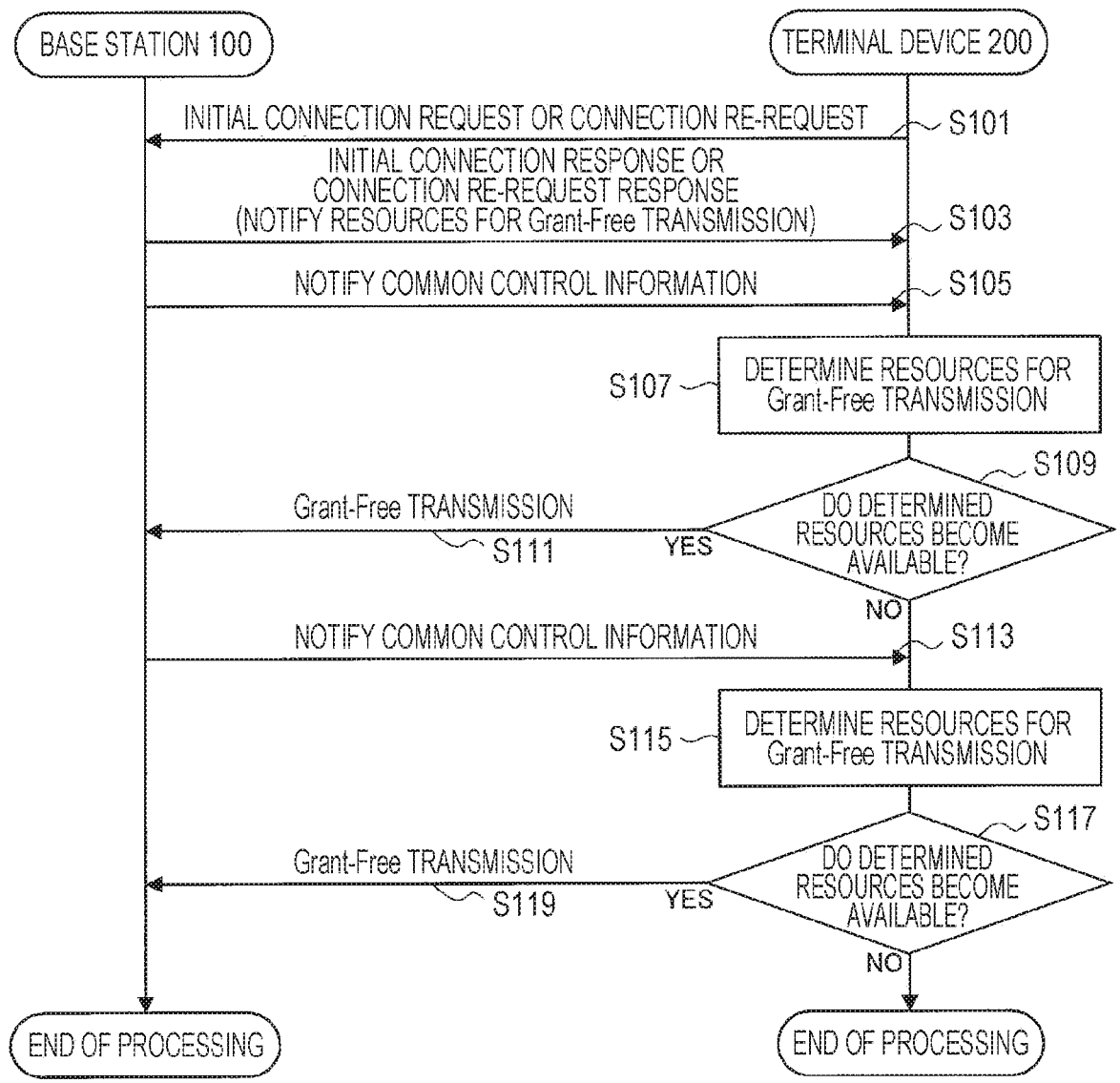
FIG. 16 is a flow chart illustrating an exemplary flow of a series of processing in the system according to the embodiment.

For example, FIG. 16 is a flow chart illustrating an exemplary flow of a series of processing of the system according to the present embodiment, and illustrates an example of a case where whether or not grant-free transmission is possible is controlled by notification.

Specifically, first, a terminal device 200 (notification unit 247) transmits an initial connection request to a base station 100 in order to establish connection with the base station 100 (S101). Then, as a response to the initial connection request, an initial connection response is transmitted from the base station 100 (notification unit 157) to the terminal device 200 (S103). As a result, connection is established between the base station 100 and the terminal device 200. In addition, in the processing indicated by the symbol S103, information related to grant-free transmission resources (that is, first control information) is notified from the base station 100 to the terminal device 200.

Meanwhile, in the case where the connection with the base station 100 is disconnected, the terminal device 200 notification unit 247) may transmit a connection re-request to the base station 100 (S101). In this case, after the connection re-request response is transmitted from the base station 100 (notification unit 157) to the terminal device 200 (S103), connection between the base station 100 and the terminal device 200 is established again. In addition, like at the time of establishment of the initial connection, information related to grant-free transmission resources (that is, first control information) is notified from the base station 100 to the terminal device 200 in the processing indicated by the symbol S103.

Next, the terminal device 200 (information acquiring unit 243) receives shared control information (that is, second control information) transmitted from base station 100 (S105). Here, the shared control information corresponds to control information transmitted to and shared by a plurality of terminal devices 200. As a specific example, control information such as control information transmitted to and shared by all terminal devices 200 accommodated in a cell and control information transmitted to and shared by a group of users using specific resources correspond to the shared control information. The shared control information also includes, for example, a group common-physical downlink control channel (PDCCH).

The terminal device 200 (determination unit 245) decodes the information transmitted from the base station 100, that is, the information related to the grant-free transmission resources (first control information) and the shared control information (second control information) respectively, and determines grant-free transmission resources on the basis of these pieces of control information (S107).

The terminal device 200 (determination unit 245) determines whether or not the determined grant-free transmission resources are available. Then, if the determined grant-free transmission resources are available (S109, YES), the terminal device 200 (communication control unit 241) may perform grant-free transmission using the resources (S111).

On the other hand, if the determined grant-free transmission resources are unavailable (S109, NO), the terminal device 200 does not perform grant-free transmission and waits for next transmission timing.

At next transmission timing, the terminal device 200 (information acquiring unit 243) receives the shared control information (that is, second control information) transmitted from the base station 100 (S113). Next, the terminal device 200 (determination unit 245) determines grant-free transmission resources on the basis of the information related to grant-free transmission resources (first control information) having been acquired before and the shared control information newly acquired (that is, second control information) (S115). In addition, the terminal device 200 (determination unit 245) determines whether or not the determined grant-free transmission resources are available. Then, if the determined grant-free transmission resources are available (S117, YES), the terminal device 200 (communication control unit 241) may perform grant-free transmission using the resources (S119), On the other hand, if the determined grant-free transmission resources are unavailable (S117, NO), the terminal device 200 does not perform grant-free transmission and again waits for next transmission timing.

Note that Grant may be performed from the base station 100 at the timing (S105, S113) when the shared control information is transmitted. In this case, the terminal device 200 (communication control unit 241) may switch to grant-based transmission.

Here, a case will be examined in which individual terminal devices 200 are notified individually instead of the shared control information described above. In this case, since the second control information is individually notified to each of the terminal devices 200, the consumption of the control information resources increases in proportion to the number of the terminal devices 200. Moreover, in this case, each of the terminal devices 200 performs blind decoding on the control information notified from the base station 100, and thus there are cases where the processing load of the terminal device 200 increases as the amount of processing of the decoding processing increases.

Figure 17:
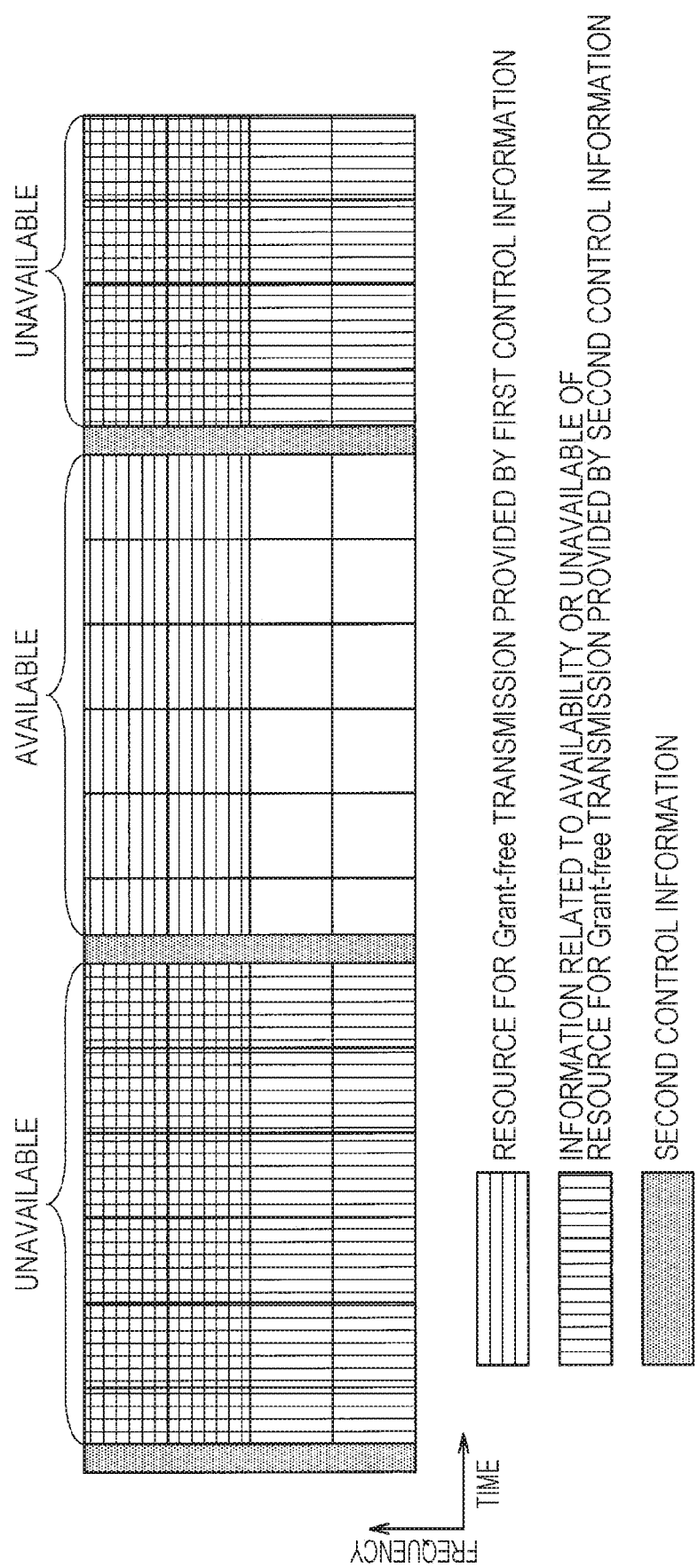
FIG. 17 is an explanatory diagram for describing a further example of resource allocation in the system according to the embodiment.

Here, an example of resource allocation will be described with reference to FIG. 17 in which whether or not grant-free transmission is possible is controlled by notification. FIG. 17 is an explanatory diagram for explaining another example of resource allocation in the system according to the present embodiment, and illustrates an example in which whether or not grant-free transmission is possible is controlled by notification.

As described above, the terminal device 200 decodes the first control information transmitted from the base station 100, and acquires the information relating to grant-free transmission resources. For example, in the example illustrated in FIG. 17, the range hatched with horizontal lines corresponds to the range of grant-free transmission resources provided by the first control information.

Next, the terminal device 200 decodes the second control information transmitted from the base station 100, and confirms whether or not notification about availability of grant-free transmission resources (that is, notification indicating whether or not grant-free transmission is possible) is included. For example, in the example illustrated in FIG. 17, the range hatched with vertical lines corresponds to the range of grant-free transmission resources, availability of which is controlled by the second control information. Note that the terminal device 200 performs grant-free transmission in a case where notification for disabling grant-free transmission resources is not included, and performs grant-free transmission in a case where the notification is included. That is, in the example illustrated in FIG. 17, resources in the range hatched only with horizontal lines are used for grant-free transmission.

Note that the example has been described in the above in which notification, indicating that grant-free transmission resources are unavailable, is selectively performed by the second control information; however, the example does not limit information to be notified as the second control information. As a specific example, notification indicating that grant-free transmission resources are available may selectively performed by the second control information.

<Exemplary Control Based on Implicit Determination>

Subsequently, an exemplary case will be described in which control information notified for a purpose different from the control of grant-free transmission is used as second control information to thereby determine whether or not to perform grant-free transmission or to determine resources used for grant-free transmission, and the operation related to grant-free transmission is thus controlled. Note that, in a case of making determination to control the operation related to grant-free transmission by using control information notified for purposes that are different from grant-free transmission control as the second control information, this determination is also referred to as "implicit determination".

(Downlink/Uplink/Sidelink Information)

For example, in the case where time division duplexing (TDD) is assumed, it is assumed that downlink, uplink, sidelink, etc. are switched in the time direction such as a certain slot being for downlink and another slot being for uplink. In a case where a structure of TDD is for downlink, performing grant-free uplink transmission in a corresponding slot is not preferable considering interference to other terminal devices 200.

Also, although it is conceivable that grant-free transmission resource information notified semi-statically includes detailed frequency information and time information, on the other hand, it is also possible that only frequency information are notified or frequency information and time information are only partially notified. For example, frequency information includes an index of a resource block (RB), an index of a resource element (RE), and the like, and time information includes a subframe index, a slot index, a symbol index, or the like. In this case, since given time information possibly includes not only uplink but also downlink or sidelink, it is preferable that grant-free transmission not be performed at such timing. Incidentally, as an example of how to determine a wireless link such as downlink or sidelink, the following is conceivable.

Uplink Downlink Sidelink Configuration
Slot Format Information

Figure 19:
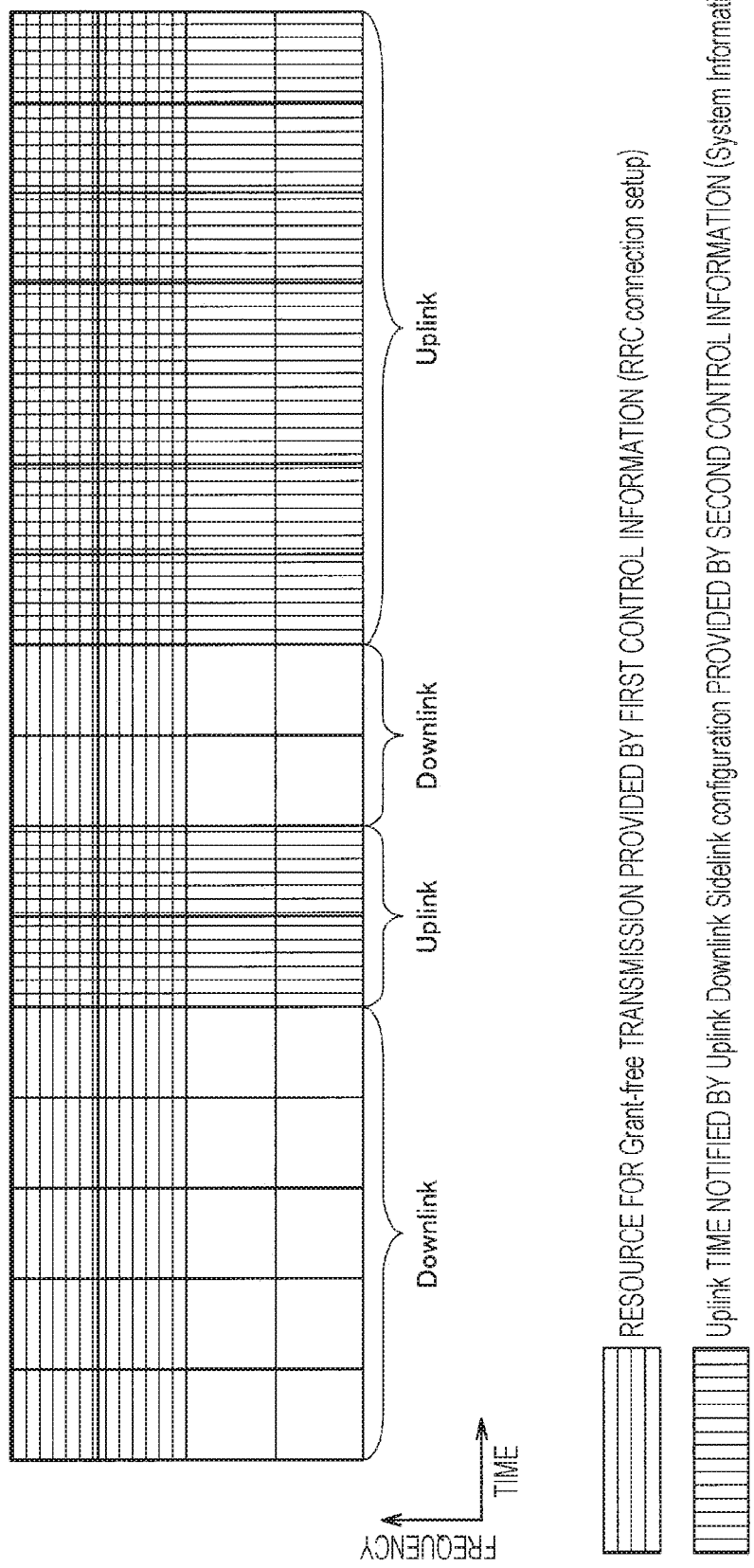
FIG. 19 is an explanatory diagram for describing still further example of resource allocation in the system according to the embodiment.

Hereinafter, each of the determinations described above will be described in detail with reference to exemplary resource allocation illustrated in FIGS. 19 and 20. Note that the unit of frequency and time resources represented by one block may be read as any of the followings in each of the frequency direction and the time direction in FIGS. 19 to 20.

Frequency direction: subcarrier, sub-band, band, resource element (RE), or resource block (RB)

Time Direction: Symbol, Mini Slot, Slot, Subframe, Frame, or Radio Frame (Uplink Downlink Sidelink Configuration)

It is conceivable that information indicating which symbol, slot, or subframe is for uplink, downlink, or sidelink (configuration information) is semi-statically provided from a base station 100 to a terminal device 200. In the system according to the present embodiment, it becomes possible for a terminal device 200 to acquire resource information available for grant-free uplink transmission by using this configuration information as second control information in addition to the information relating to the grant-free transmission resources (that is, first control information) provided in advance from the base station 100.

Figure 18:
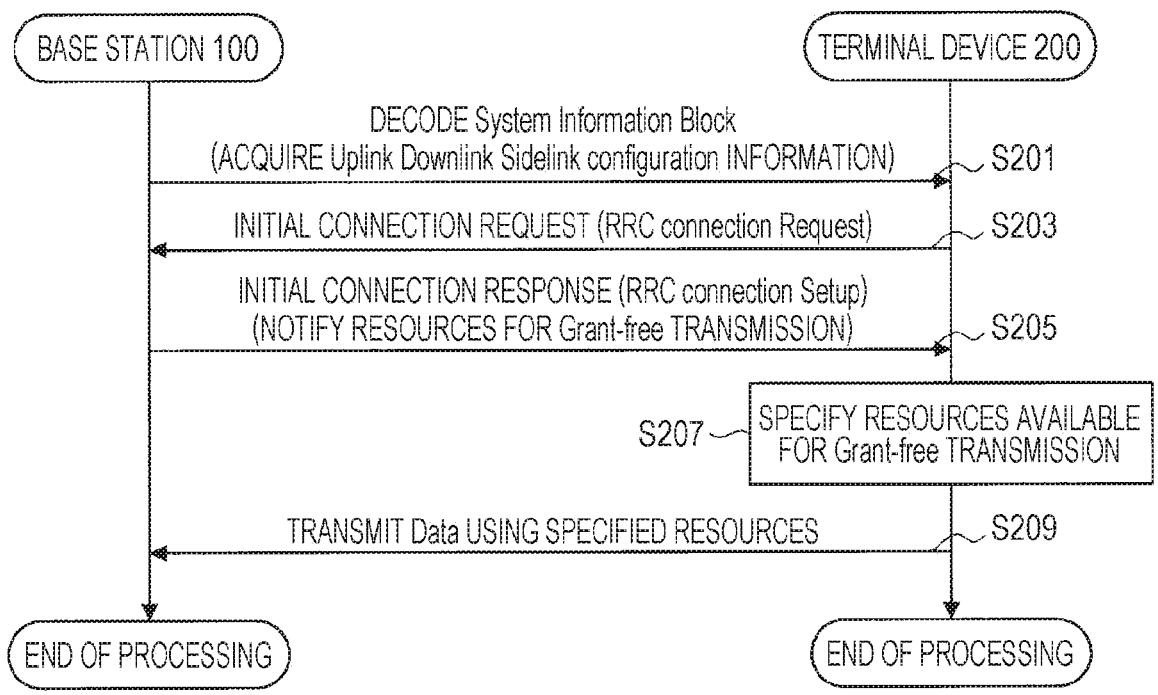
FIG. 18 is a flow chart illustrating an exemplary flow of a series of processing in the system according to the embodiment.

For example, FIG. 18 is a flow chart illustrating an exemplary flow of a series of processing of the system according to the present embodiment, and illustrates an example in which information of resources available for grant-free uplink transmission is acquired by using configuration information such as uplink, downlink, and sidelink as second control information.

Specifically, first, a terminal device 200 (information acquiring unit 243) decodes a system information block notified from a base station 100 to acquire configuration information such as uplink, downlink, and sidelink (that is, second control information) (S201). Here, the notification from the base station 100 may include, for example, a notification regarding to a configuration of only uplink and downlink.

Next, the terminal device 200 acquires information relating to grant-free transmission resources (that is, first control information) by RRC signaling such as RRC connection setup. Specifically, the terminal device 200 (notification unit 247) transmits an initial connection request (RRC connection request) to the base station 100 (S203). The terminal device 200 (information acquiring unit 243) then acquires an initial connection response (RRC connection setup) from the base station 100 as a response to the initial connection request (S205). As a result, connection is established between the base station 100 and the terminal device 200. In addition, in the processing indicated by the symbol S205, information related to grant-free transmission resources (that is, first control information) is notified from the base station 100 to the terminal device 200.

Next, the terminal device 200 (determination unit 245) determines resources available for grant-free transmission on the basis of configuration information such as uplink, downlink, and sidelink (that is, second control information) and information relating to grant-free transmission resources (that is, first control information) (S207). Then, the terminal device 200 (communication control unit 241) performs grant-free transmission using the specified resources (S209).

Here, an example of resource allocation in the case of using configuration information such as uplink, downlink, and sidelink as second control information will be described with reference to FIG. 19. FIG. 19 is an explanatory diagram for describing an example of resource allocation in the system according to the present embodiment, and illustrates an example in which configuration information such as uplink, downlink, and sidelink is used as second control information.

As described above, the information relating to the grant-free transmission resources is provided from the base station 100 to the terminal device 200 by the first control information notified by RRC signaling or the like. For example, in the example illustrated in FIG. 19, the range hatched with horizontal lines corresponds to the range of grant-free transmission resources provided by the first control information.

Furthermore, configuration information such as uplink, downlink, and sidelink is notified, as second control information, by system information and the like, and grant-free transmission is performed on the basis of this information only in uplink sections. For example, in the example illustrated in FIG. 19, the range hatched with vertical lines corresponds to uplink sections. That is, in the case of the example illustrated in FIG. 19, the resources included in the range in which the horizontally hatched range and the vertically hatched range overlap with each other are used as grant-free transmission resources.

Note that although the example of configuration information of uplink, downlink, and sidelink has been described in the above, the example does not the content of the configuration information. As a specific example, configuration information of only uplink and downlink may be used as the second control information, or configuration information of downlink, uplink, and others may be used as the second control information.

(Slot Format Information)

In a case where the structure is dynamically switched such as in the dynamic TDD, a terminal device 200 needs to determine a period during which radio links such as uplink, downlink, and sidelink are supported on the basis of shared control information dynamically provided from a base station 100. As a specific example, there are cases where slot format information is included in the shared control information provided from the base station 100 to a plurality of terminal devices 200, such as group-common PDCCH. The slot format information includes information such as information about which period is set for downlink and which period is set for uplink.

In view of such a situation, a terminal device 200 according to the present embodiment may use, for example, slot format information as second control information. Specifically, the terminal device 200 that performs grant-free transmission receives and decodes the slot format information before performing grant-free transmission, and determines appropriate timing for the grant-free transmission from the slot format information. Then, on the basis of the determination result, the terminal device 200 performs grant-free transmission at timing that allows for uplink transmission.

An example of the relationship between the period corresponding to radio links such as uplink, downlink, and sidelink and control relating to grant-free uplink transmission will be illustrated in (1) to (6) below.

(1) In a case where slot format information indicates downlink only: grant-free uplink transmission is not performed.
(2) In a case where slot format information indicates uplink only: grant-free uplink transmission is performed.
(3) In a case where slot format information indicates both downlink and uplink being mixed: grant-free uplink transmission is performed only at uplink timing.
(4) In a case where slot format information indicates sidelink: grant-free uplink transmission is not performed.
(5) In a case where slot format information is blank: grant-free uplink transmission is not performed.
(6) In a case where slot format information is others: grant-free uplink transmission is not performed.

Here, an example of resource allocation in the case of using slot format information as second control information will be described with reference to FIG. 20. FIG. 20 is an explanatory diagram for describing another example of resource allocation in the system according to the present embodiment, and illustrates an example in which slot format information is used as second control information.

Figure 20:
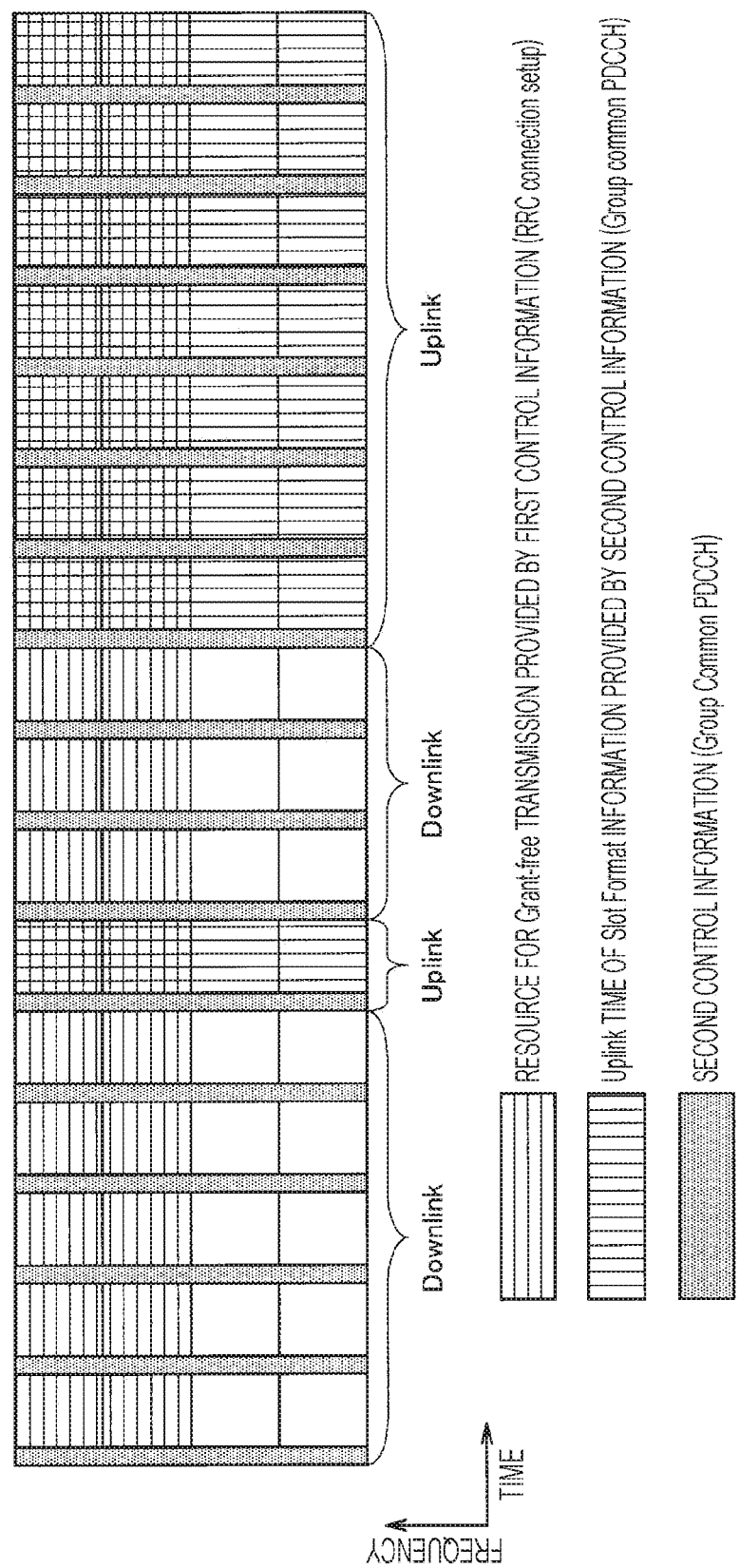
FIG. 20 is an explanatory diagram for describing yet further example of resource allocation in the system according to the embodiment.

In the example illustrated in FIG. 20, a terminal device 200 acquires information related to grant-free transmission resources on the basis of first control information notified from a base station 100. Next, the terminal device 200 acquires slot format information on the basis of second control information (for example, group-common PDCCH) notified from the base station 100. Then, the terminal device 200 specifies resources available for grant-free transmission on the basis of the acquired information relating to the grant-free transmission resources and the slot format information, and performs grant-free transmission using the specified resources.

For example, in the example illustrated in FIG. 20, the range hatched with horizontal lines corresponds to the range of grant-free transmission resources provided by the first control information. Moreover, the range hatched with horizontal lines corresponds to an uplink section defined on the basis of the slot format information. That is, in the case of the example illustrated in FIG. 20, the resources included in the range in which the horizontally hatched range vertically hatched range overlap with each other are used as grant-free transmission resources.

Note that although the above is an example of grant-free uplink transmission control based on a similar idea may be performed in grant-free sidelink transmission as well. As a specific example, in the case of grant-free sidelink transmission, it is preferable that grant-free transmission be performed in a case where the slot format information indicates uplink or sidelink.

Meanwhile, it is possible to assume a case where shared control information does not include slot format information or shared control information is not notified. In such a case, control relating to grant-free transmission may be performed in accordance with the configuration setting of uplink, downlink, and sidelink as in the example described with reference to FIG. 19.

Further, even in a case where a control signal including slot format information is transmitted from the base station 100 to the terminal device 200, there may be a situation in which the terminal device 200 cannot receive the control signal. In such a case, the terminal device 200 is not required to perform grant-free transmission in order to avoid interference with other terminal devices 200. Alternatively, granting may be performed from the base station 100, and in this case, the terminal device 200 may perform grant-based transmission using granted resources.

The example has been described in the above in which control relating to grant-free transmission is performed by using slot format information as second control information. Note that, in the above description, a slot format may be read as a slot structure, a frame format, or the like.

Exemplary Control in Case where Grant Information is Notified

A terminal device 200 may perform blind decoding as to whether or not grant information has been transmitted from a base station 100 to the terminal device 200 before attempting grant-free transmission. Note that in this case the grant information corresponds to second control information. Moreover, in this case the terminal device 200 may perform grant-based transmission using resources notified by the grant information.

As a specific example, in a case where the terminal device 200 receives the grant information transmitted from the base station 100, the terminal device 200 may perform grant-based transmission using the resources notified by the grant information without performing grant-free transmission. As another example, in a case where the resources notified by the grant information do not overlap with the grant-free transmission resources, the terminal device 200 may use the resources notified by the grant information to perform grant-based transmission and transmit next transmission data in a grant-free manner in order to further reduce the delay.

Note that each operation described as examples above may be selectively switched depending on a terminal category of the terminal device 200. For example, in a case where the terminal device 200 is in a terminal category that supports simultaneous transmission of grant-based transmission and grant-free transmission, the terminal device 200 may use both of resources notified by grant information and grant-free transmission resources to perform simultaneous transmission. Meanwhile, in the case of a terminal category that does not support simultaneous transmission, the terminal device 200 may not perform grant-free transmission by giving a priority to grant-based transmission. Moreover, in this case, priorities may be statically determined or may be instructed from the base station 100 semi-statically or dynamically.

It is also possible to assume a case where at least some of the grant-free transmission resources notified by the first control information is granted to a specific terminal device 200. In such a case, the terminal device 200 notified of the grant-based transmission resources by, grant information may use the resources preferentially. Alternatively, as another example, the terminal device 200 may always use the resources notified by the grant information without performing grant-free transmission. Moreover, in this case, in order to avoid the resources granted to the specific terminal device 200 from being used by another terminal device 200, notification to disable the use of the resources may be performed to the other terminal device 200 to limit the use of the resources by the other terminal device 200.

(Exemplary Control at Transmission Timing Which Is Synonymous With Downlink)

Among various channels, there are some channels used only for downlink. Examples of such channels include NR-SS including a primary synchronization signal (PSS) and a secondary synchronization signal (SSS), a broadcast channel including master information, an RS channel including a channel state information-reference signal (CSI-RS). Since these symbols are for downlink, control may be performed in such a manner that grant-free uplink transmission is not performed in a section corresponding to the symbols (that is, symbol section). In this case, the NR-SS, broadcast information, RS information, or the like correspond to second control information.

Figure 21:
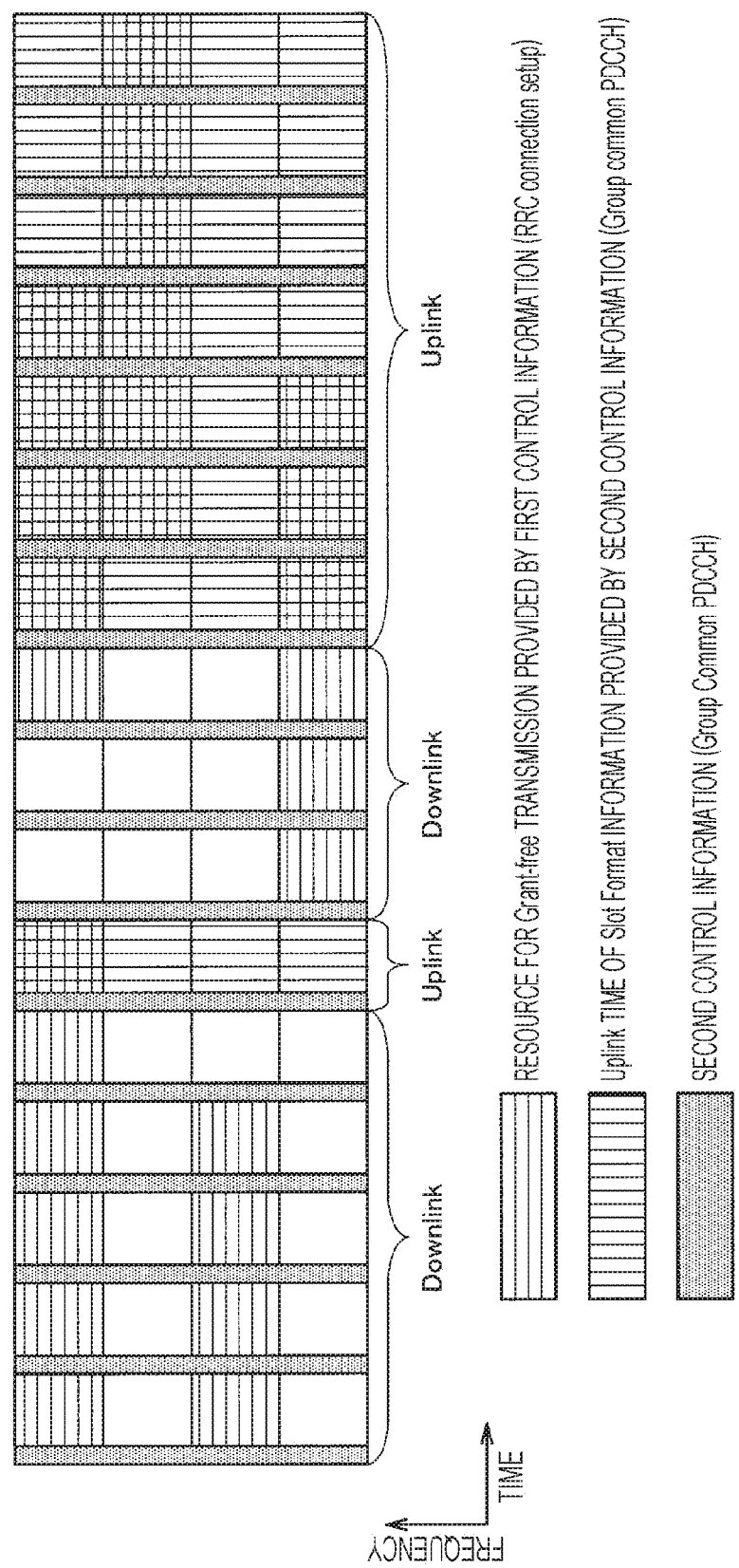
FIG. 21 is an explanatory diagram for describing further another example of resource allocation in the system according to the embodiment.

Note that, in the above description, the example in which grant-free transmission resources provided by the first control information are continuously allocated in the frequency direction or the time direction has been described. On the other hand, grant-free transmission resources provided by the first control information may be allocated discontinuously and irregularly in both the frequency direction and the time direction. For example, FIG. 21 is an explanatory diagram for describing another example of resource allocation in the system according to the embodiment. Specifically, the example illustrated in FIG. 21 corresponds to the example illustrated in FIG. 20, in which the grant-free transmission resources provided by the first control information are made discontinuous and irregular in the frequency direction and the time direction. Note that, the unit of frequency and time resources represented by one block in FIG. 21 is similar to that of the example illustrated in FIG. 20. Here, the timing of frequency and time at which resources become discontinuous or irregular may be at any point, and this information is provided by the first control information. Grant-free transmission resources may be similarly allocated discontinuously or irregularly also in the other examples described above without being limited to the example illustrated in FIG. 21.

Also, in the above description, the embodiments have been described for the two axes of the frequency axis and the time axis. Meanwhile, the technology according to the present disclosure can also be applied to an embodiment having three or more axes considering an axis of another element in addition to the frequency axis and the time axis. As a specific example, there is an example in which non-orthogonal multiple access (NOMA) is considered in addition to the frequency and time. Note that examples of the non-orthogonal axis include an interleave pattern axis, a spreading pattern axis, a scrambling pattern axis, a codebook axis, and a power axis. An index or a pattern of these non-orthogonal axes may be referred to as multiple access (MA) signatures.

Figure 22:
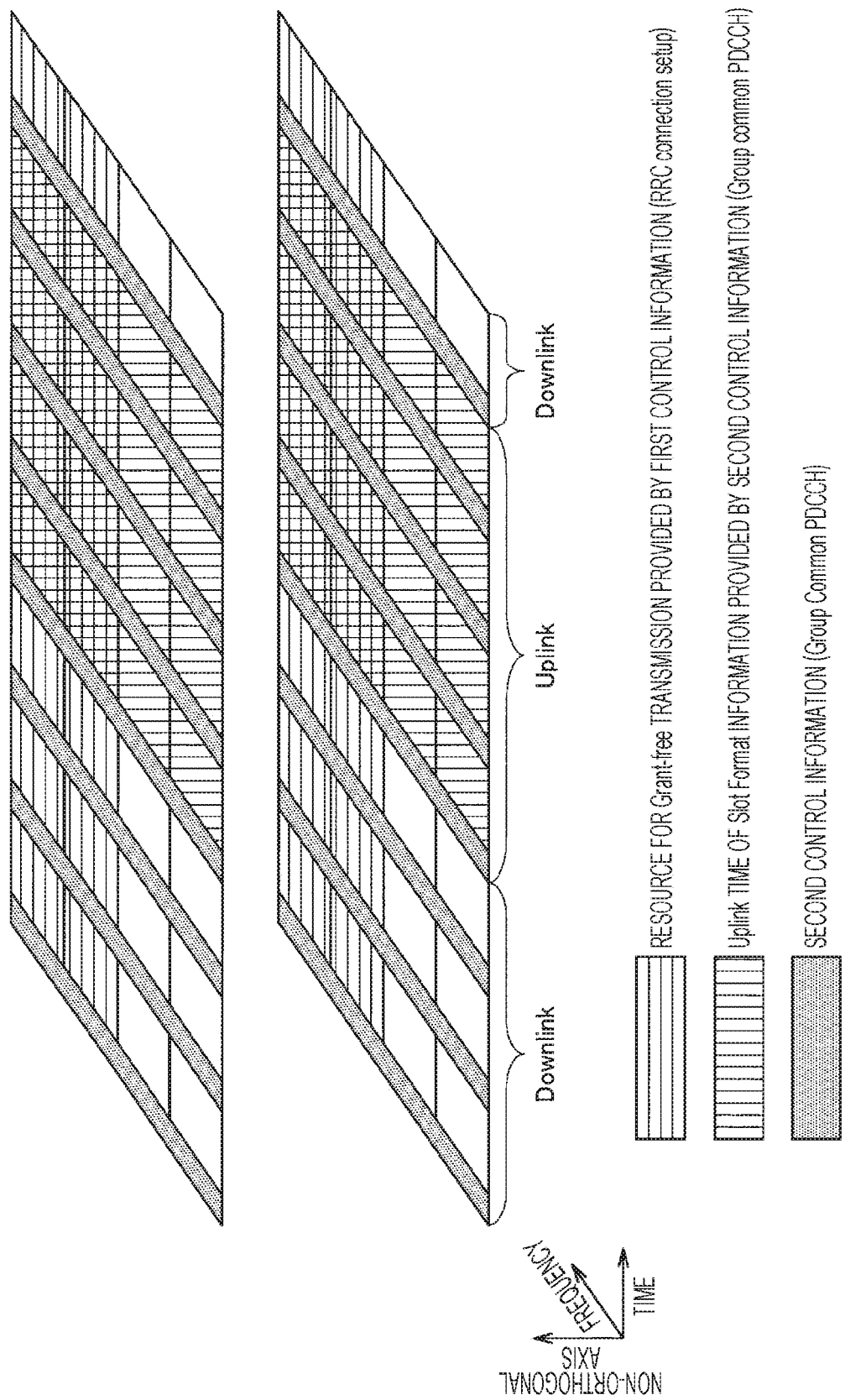
FIG. 22 is an explanatory diagram for describing still another example of resource allocation in the system according to the embodiment.

For example, FIG. 22 is an explanatory diagram for describing still another example of resource allocation in the system according to the embodiment. Specifically, FIG. 22 is a diagram illustrating an example in which a non-orthogonal axis is further added to the example illustrated in FIG. 20. That is, in the example illustrated in FIG. 22, an example in which three axes of the frequency axis, the time axis, and the non-orthogonal axis are considered is illustrated. As illustrated in FIG. 22, even in a case where resources increase in the non-orthogonal axes, it is possible to configure the system in such a manner that grant-free transmission resources are determined as explicitly or implicitly like in the above-described embodiments. That is, in the example illustrated in FIG. 22, resources which are included in a range, in which the range of resources notified by first control information and the range corresponding to uplink notified by second control information overlap each other, are used as grant-free transmission resources, and this similarly applies to the non-orthogonal axis as well. Moreover, it is also possible to similarly adopt a configuration considering an axis of another element (for example, non-orthogonal axis) in addition to the frequency axis and the time axis, also in the other examples described above without being limited to the example illustrated in FIG. 22.

In addition, the portions referred to as "resources" in the above-described embodiments may be referred to as "MA resources" or "MA physical resources", for example.

3. EXEMPLARY APPLICATIONS

The technology according to the resent disclosure is applicable to various products. For example, the base station 100 may be implemented as any type of evolved node B (eNB) such as a macro eNB or a small eNB. A small eNB may be an eNB that covers a cell smaller than a macrocell, such as a pico eNB, a micro eNB, or a home (femto) eNB. Instead, the base station 100 may be implemented as another type of base station such as a Node B or a base transceiver station (BTS). The base station 100 may include a main body (also referred to as a base station device) that controls wireless communication, and one or more remote radio heads (RRHs) arranged at a location different from the main body. Alternatively, various types of terminals to be described later may operate as the base station 100 by temporarily or semi-permanently executing the base station function. Furthermore, at least some components of the base station 100 may be implemented in the base station device or a module for the base station device.

Also, for example, the terminal device 200 may be implemented as a smartphone, a tablet personal computer (PC), a laptop PC, a portable game terminal, a mobile terminal such as a mobile/dangle-type mobile router or a digital camera, or an on-board terminal such as a car navigation device. The terminal device 200 may be implemented as a terminal (also referred to as a machine type communication (MTC) terminal) that performs machine to machine (M2M) communication. Also, the terminal device 200 may be implemented as a so-called low-cost terminal such as an MTC terminal, an eMTC terminal, and an NB-IoT terminal. Furthermore, at least some components of the terminal device 200 may be implemented in a module mounted on these terminals (for example, an integrated circuit module configured by a single die).

<3.1. Exemplary Application in Base Station>

(First Exemplary Application)

Figure 23:
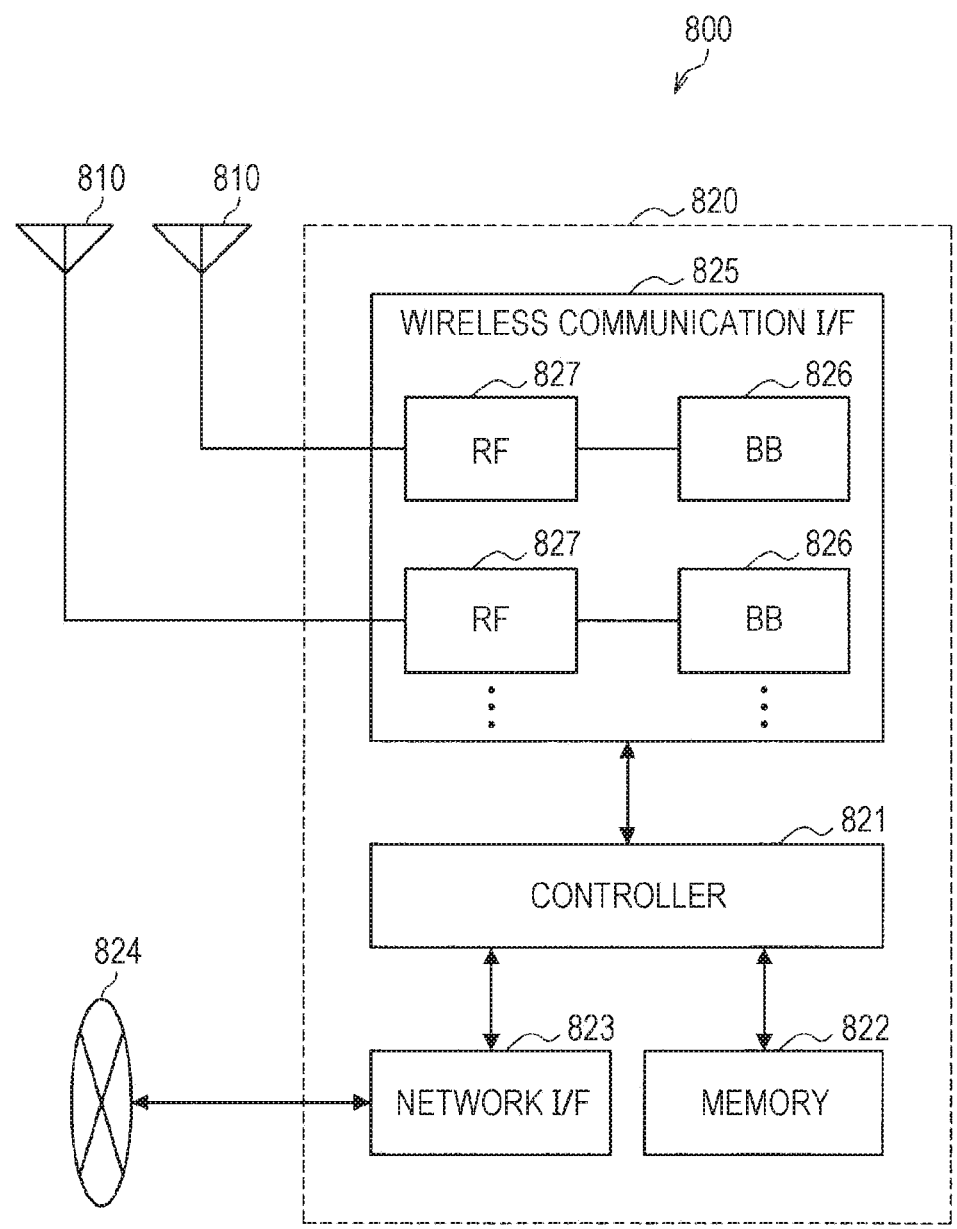
FIG. 23 is a block diagram illustrating a first exemplary schematic configuration of an eNB.

FIG. 23 is a block diagram illustrating a first example of a schematic configuration of an eNB to which the technology according to the present disclosure can be applied. An eNB 800 includes one or more antennas 810 and a base station device 820. Each of the antennas 810 and the base station device 820 can be connected to each other via an RF cable.

Each of the antennas 810 includes a single or a plurality of antenna elements (for example, a plurality of antenna elements included in an MIMO antenna) and is used for transmission and reception of radio signals by the base station device 820. The eNB 800 includes the plurality of antennas 810 as illustrated in FIG. 23, and the multiple antennas 810 may each correspond to, for example, multiple frequency bands used by the eNB 800. Note that although FIG. 23 illustrates an example in which the eNB 800 includes the plurality of antennas 810, the eNB 800 may include a single antenna 810.

The base station device 820 includes a controller 821, a memory 822, a network interface 823, and a wireless communication interface 825.

The controller 821 may be, for example, a CPU or a DSP, and causes various functions of upper layers of the base station device 820 to operate. For example, the controller 821 generates a data packet from data in signals processed by the wireless communication interface 825, and transfers the generated packet via the network interface 823. The controller 821 may generate a bundled packet by bundling data from a plurality of baseband processors and transfer the generated bundled packet. The controller 821 may further have logical functions for executing control such as radio resource control, radio bearer control, mobility management, admission control, or scheduling. Moreover, the control may be performed in cooperation with neighboring eNBs or core network nodes. The memory 822 includes a RAM and a ROM, and stores programs executed by the controller 821 and various types of control data (for example, list of terminals, transmission power data, scheduling data, etc.).

The network interface 823 is a communication interface for connecting the base station device 820 to a core network 824. The controller 821 may communicate with core network nodes or other eNBs via the network interface 823. In this case, the eNB 800 and the core network nodes or the other eNBs may be connected to each other by a logical interface (for example, S1 interface or X2 interface). The network interface 823 may be a wired communication interface or a wireless communication interface for a wireless backhaul. In a case where the network interface 823 is a wireless communication interface, the network interface 823 may use a higher frequency band for wireless communication than a frequency band used by the wireless communication interface 825.

The wireless communication interface 825 supports a cellular communication scheme such as the long-term evolution (LTE) or LTE-Advanced, and provides wireless connection to a terminal located in a cell of the eNB 800 via the antennas 810. The wireless communication interface 825 may typically include baseband (BB) processors 826, RF circuits 827, and the like. The BB processors 826 may perform, for example, coding/decoding, modulation/demodulation, and multiplexing/demultiplexing and performs various types of signal processing of respective layers (e g. L1, medium access control (MAC), radio link control (RLC), and packet data convergence protocol (PDCP)). ABB processor 826 may have some or all of the logical functions described above instead of the controller 821. BB processor 826 may be a module including a memory that stores a communication control program, a processor that executes the program, and related circuits, and the function of the BB processor 826 may be changed by update of the program. Moreover, the module may be a card or a blade inserted into a slot of the base station device 820, or may be a chip mounted on the card or the blade, Meanwhile, an RF circuit 827 may include a mixer, a filter, and an amplifier, and transmits and receives a radio signal via an antenna 810.

The wireless communication interface 825 includes a plurality of BB processors 826 as illustrated in FIG. 23, and the multiple BB processors 826 may each correspond to, for example, multiple frequency bands used by the eNB 800. In addition, the wireless communication interface 825 includes a plurality of RF circuits 827 as illustrated in FIG. 23, and the multiple RF circuits 827 may each correspond to, for example, multiple antenna elements. Note that although FIG. 23 illustrates the example in which the wireless communication interface 825 includes the plurality of BB processors 826 and the plurality of RF circuits 827, the wireless communication interface 825 may include a single BB processor 826 or a single RF circuit 827.

In the eNB 800 illustrated in FIG. 23, one or more components (at least one of the communication control unit 151, the information acquiring unit 153, or the notification unit 157) included in the processing unit 150 described with reference to FIG. 2 may be implemented in the wireless communication interface 825. Alternatively, at least a part of these components may be implemented in the controller 821. As one example, the eNB 800 may be mounted with a module including a part or all of the wireless communication interface 825 (for example, the BB processor 826) and/or the controller 821, and the module may implement at least one of the above components. In this case, the module may store a program for causing the processor to function as at least one of the above components (in other words, a program for causing the processor to execute the operation of at least one of the above components) and execute the program. As another example, a program for causing a processor to function as at least one of the above components may be installed in the eNB 800, and the wireless communication interface 825 (for example, the BB processors 826) and/or the controller 821 may execute the program. As described above, the eNB 800, the base station device 820, or the module may be provided as a device including at least one of the above components, and a program for causing a processor to function as at least one of the above components may be provided. Alternatively, a readable recording medium recording the above program may be provided.

Moreover, in the eNB 800 illustrated in FIG. 23, the wireless communication unit 120 described with reference to FIG. 2 may be implemented by the wireless communication interface 825 (for example, RF circuits 827). Moreover, the antenna unit 110 may be implemented by the antennas 810. Furthermore, the network communication unit 130 may be implemented by the controller 821 and/or the network interface 823. In addition, the storage unit 140 may be implemented by the memory 822.

(Second Exemplary Application)

Figure 24:
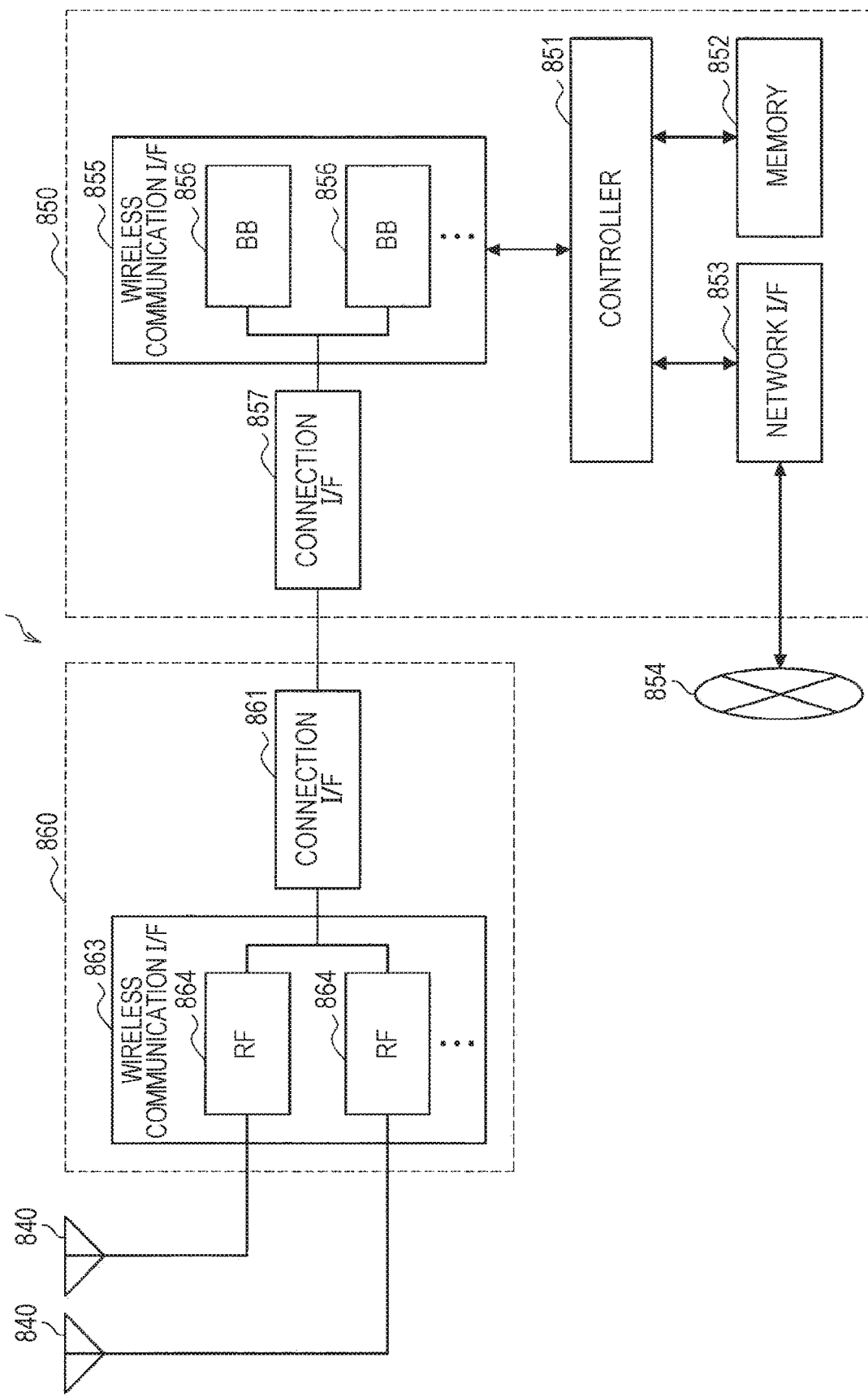
FIG. 24 is a block diagram illustrating a second exemplary schematic configuration of an eNB.

FIG. 24 is a block diagram illustrating a second example of a schematic configuration of an eNB to which the technology according to the present disclosure can be applied. An eNB 830 includes one or more antennas 840, a base station device 850, and an RRH 860. Each of the antennas 840 and the RRH 860 can be connected to each other via an RF cable. Moreover, the base station device 850 and the RRH 860 may be connected to each other by a high-speed line such as an optical fiber cable.

Each of the antennas 840 includes a single or a plurality of antenna elements (for example, a plurality of antenna elements included in an MIMO antenna) and is used for transmission and reception of radio signals by the RRH 860. The eNB 830 includes the plurality of antennas 840 as illustrated in FIG. 24, and the multiple antennas 840 may each correspond to, for example, multiple frequency bands used by the eNB 830. Note that although FIG. 24 illustrates the example in which the eNB 830 includes the plurality of antennas 840, the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 having been described with reference to FIG. 23.

The wireless communication interface 855 supports a cellular communication scheme such as LTE or LTE-Advanced, and provides wireless connection to terminals located in a sector corresponding to the RRH 860 via the RRH 860 and the antennas 840. The wireless communication interface 855 may typically include BB processors 856 and the like. The BB processors 856 are similar to the BB processors 826 described with reference to FIG. 23 except that the BB processors 856 are connected to RF circuits 864 of the RRH 860 via the connection interface 857. The wireless communication interface 855 includes a plurality of BB processors 856 as illustrated in FIG. 23, and the multiple BB processors 856 may each correspond to, for example, multiple frequency bands used by the eNB 830. Note that although FIG. 24 illustrates the example in which the wireless communication interface 855 includes the plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high-speed line connecting the base station device 850 (wireless communication interface 855) and the RRH 860.

Meanwhile, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives a radio signal via the antennas 840. The wireless communication interface 863 may typically include RF circuits 864 and the like. An RF circuit 864 may include a mixer, a filter, and an amplifier, and transmits and receives a radio signal through an antenna 840. The wireless communication interface 863 includes a plurality of RF circuits 864 as illustrated in FIG. 24, and the multiple RF circuits 864 may each correspond to, for example, multiple antenna elements. Note that although FIG. 24 illustrates the example in which the wireless communication interface 863 includes the plurality of RF circuits 864, the wireless communication interface 863 may include a single RF circuit 864.

In the eNB 830 illustrated in FIG. 24, one or more components (at least one of the communication control unit 151, the information acquiring unit 153, or the notification unit 157) included in the processing unit 150 described with reference to FIG. 2 may be implemented in the wireless communication interface 855 and/or the wireless communication interface 863. Alternatively, at least a part of these components may be implemented in the controller 851. As one example, the eNB 830 may be mounted with a module including a part or all of the wireless communication interface 855 (for example, the BB processor 856) and/or the controller 851, and the module may implement at least one of the above components. In this case, the module may store a program for causing the processor to function as at least one of the above components (in other words, a program for causing the processor to execute the operation of at least one of the above components) and execute the program. As another example, a program for causing a processor to function as at least one of the above components may be installed in the eNB 830, and the wireless communication interface 855 (for example, the BB processors 856) and/or the controller 851 may execute the program. As described above, the eNB 830, the base station device 850, or the module may be provided as a device including at least one of the above components, and a program for causing a processor to function as at least one of the above components may be provided. Alternatively, a readable recording medium recording the above program may be provided.

Moreover, in the eNB 830 illustrated in FIG. 24, for example the wireless communication unit 120 described with reference to FIG. 2 may be implemented by the wireless communication interface 863 (for example, RF circuits 864). Moreover, the antenna unit 110 may be implemented by the antennas 840. Furthermore, the network communication unit 130 may be implemented by the controller 851 and/or the network interface 853. In addition, the storage unit 140 may be implemented by the memory 852.

<3.2. Exemplary Application in Terminal Device>

(First Exemplary Application)

Figure 25:
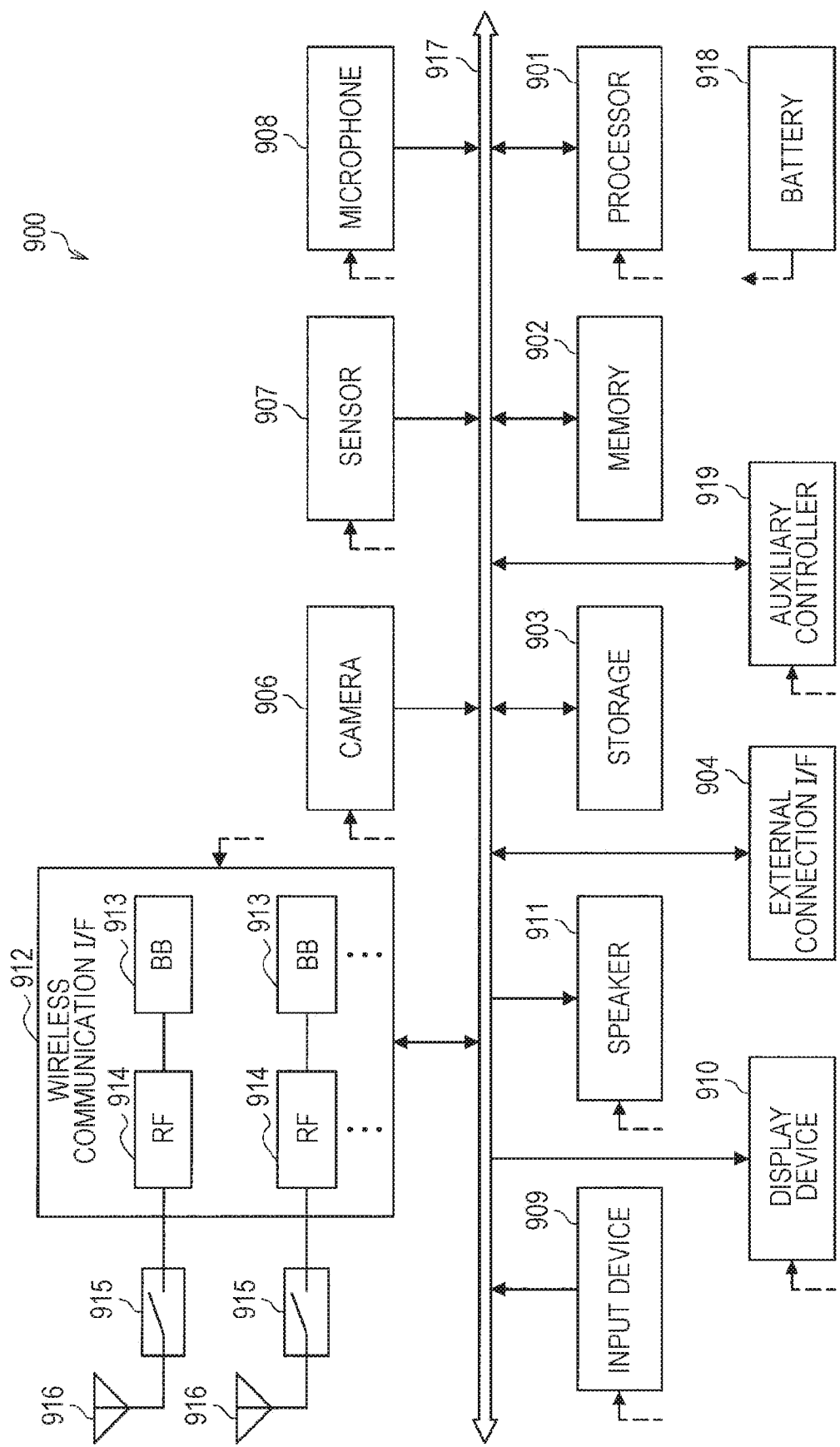
FIG. 25 is a block diagram illustrating an exemplary schematic configuration of a smartphone.

FIG. 25 is a block diagram illustrating an exemplary schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC) and controls functions of the application layer and other layers of the smartphone 900. The memory 902 includes a RAM and a ROM and stores a program and data executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 has an imaging element such as a charge coupled device (CCD) or a complementary metal oxide semiconductor (CMOS) and generates a captured image. The sensor 907 may include a group of sensors such as a positioning sensor, a gyro sensor, a geomagnetic sensor, and an acceleration sensor. The microphone 908 converts sound input to the smartphone 900 into an audio signal. The input device 909 includes, for example, a touch sensor for detecting a touch on the screen of the display device 910, a keypad, a keyboard, a button, a switch, or other components and accepts operation or information input by a user. The display device 910 has a screen such as a liquid crystal display (LCD) or an organic light emitting diode (OLED) display and displays an output image of the smartphone 900. The speaker 911 converts an audio signal output from the smartphone 900 into the sound.

The wireless communication interface 912 supports a cellular communication scheme such as LTE or LTE-Advanced and performs wireless communication. The wireless communication interface 912 may typically include a BB processor 913, an RF circuit 914, and the like. The BB processor 913 may perform, for example, encoding/decoding, modulation/demodulation, multiplexing/demultiplexing, etc., and executes various types of signal processing for wireless communication. Meanwhile, the RF circuit 914 may include a mixer, a filter, and an amplifier, and transmits and receives a radio signal through an antenna 916. The wireless communication interface 912 may be a one-chip module in which BB processors 913 and RF circuits 914 are integrated. The wireless communication interface 912 may include a plurality of BB processors 913 and a plurality of RF circuits 914 as illustrated in FIG. 25. Note that although FIG. 25 illustrates the example in which the wireless communication interface 912 includes a plurality of BB processors 913 and a plurality of RE circuits 914, the wireless communication interface 912 may include a single BB processor 913 or a single RF circuit 914.

Moreover, the wireless communication interface 912 may support other types of wireless communication schemes in addition to the cellular communication scheme, such as a short-distance wireless communication scheme, a proximity wireless communication scheme, or a wireless local area network (LAN) system, in which case BB processors 913 and RF circuits 914 for each wireless communication scheme may be included.

Each of the antenna switches 915 switches a connection destination of an antenna 916 between multiple circuits (for example, circuits for different wireless communication schemes) included in the wireless communication interface 912.

Each of the antennas 916 includes a single or a plurality of antenna elements (for example, a plurality of antenna elements included in an MIMO antenna) and is used for transmission and reception of radio signals by the wireless communication interface 912. The smartphone 900 may have a plurality of antennas 916 as illustrated in FIG. 25. Note that, although FIG. 25 illustrates an example in which the smartphone 900 includes the plurality of antennas 916, the smartphone 900 may include a single antenna 916.

The smartphone 900 may further include antennas 916 for each wireless communication scheme. In this case, the antenna switches 915 may be omitted in the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 25 via power supply lines partially indicated by broken lines in the drawing. The auxiliary controller 919 causes the minimum required functions of the smartphone 900 to operate, for example, in a sleep mode.

In the smartphone 900 illustrated in FIG. 25, one or more components (at least one of the communication control unit 241, the information acquiring unit 243, the determination unit 245, or the notification unit 247) included in the processing unit 240 described with reference to FIG. 3 may be implemented in the wireless communication interface 912. Alternatively, at least one of these components may be implemented in the processor 901 or the auxiliary controller 919. As one example, the smartphone 900 may be mounted with a module including a part or all of the wireless communication interface 912 (for example, the BB processor 913), the processor 901, and/or the auxiliary controller 919, and the module may implement at least one of the above components. In this case, the module may store a program for causing the processor to function as at least one of the above components (in other words, a program for causing the processor to execute the operation of at least one of the above components) and execute the program. As another example, a program for causing the processor to function as at least one of the above components may be installed in the smartphone 900, and the wireless communication interface 912 (for example, the BB processors 913), the processor 901, and/or the auxiliary controller 919 may execute the program. As described above, the smartphone 900 or the module may be provided as a device including at least one of the above components, and a program for causing the processor to function as at least one of the above components may be provided. Alternatively, a readable recording medium recording the above program may be provided.

Moreover, in the smartphone 900 illustrated in FIG. 25, for example the wireless communication unit 220 described with reference to FIG. 3 may be implemented by the wireless communication interface 912 (for example, RF circuits 914). Moreover, the antenna unit 210 may be implemented by the antennas 916. In addition, the storage unit 230 may be implemented by the memory 902.

(Second Exemplary Application)

Figure 26:
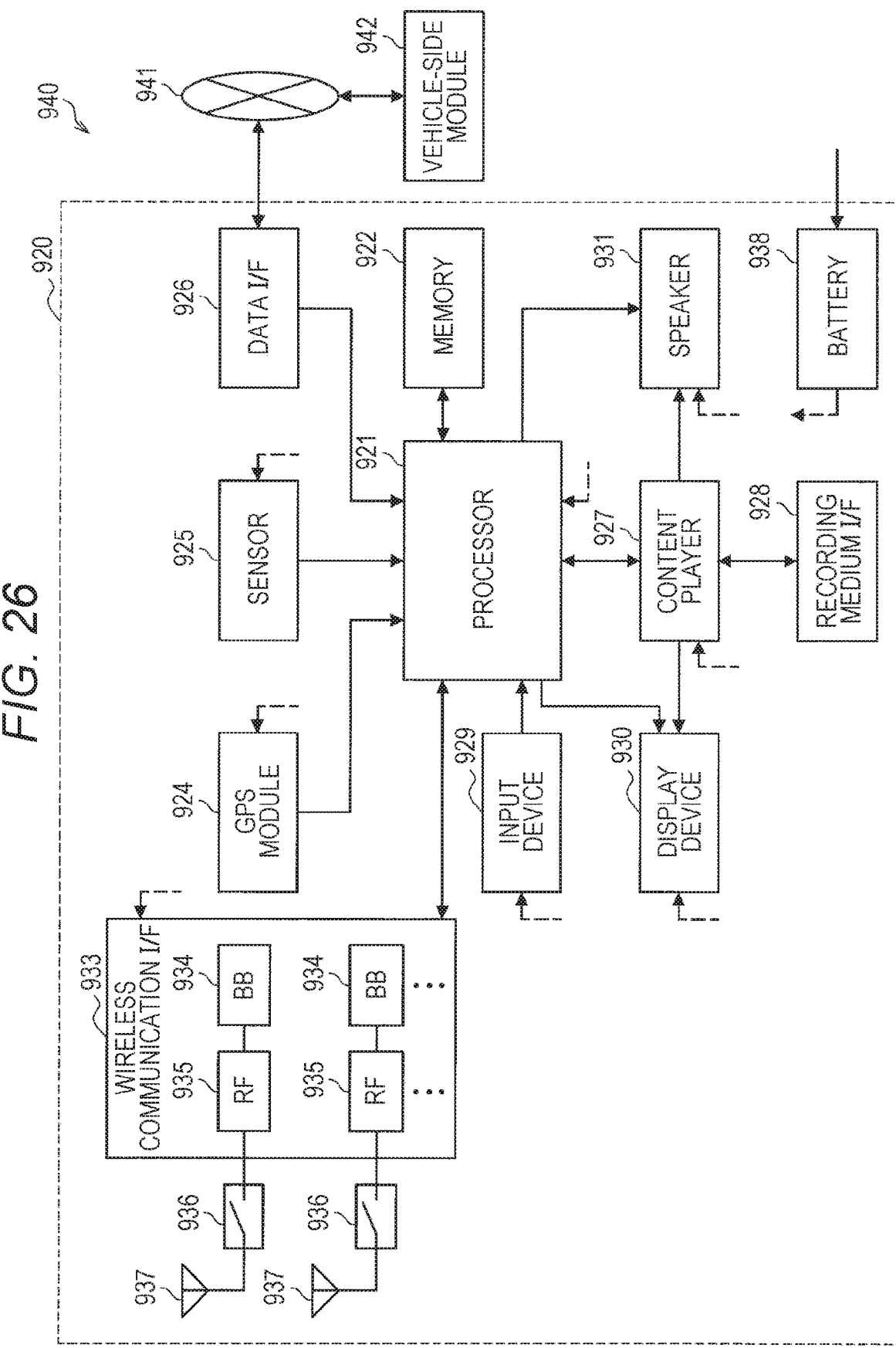
FIG. 26 is a block diagram illustrating an exemplary schematic configuration of a car navigation device.

FIG. 26 is a block diagram illustrating an exemplary schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC and controls a navigation function and other functions of the car navigation device 920. The memory 922 includes a RAM and a ROM and stores a program and data executed by the processor 921.

The GPS module 924 measures the position (for example, latitude, longitude, and altitude) of the car navigation device 920 using GPS signals received from the GPS satellites. The sensor 925 may include a group of sensors such as a gyro sensor, a geomagnetic sensor, and an atmospheric pressure sensor. The data interface 926 is, for example, connected to an in-vehicle network 941 via a terminal (not illustrated) and acquires data generated on a vehicle side such as speed data.

The content player 927 reproduces the content stored in a storage medium (for example, a CD or a DVD) inserted into the storage medium interface 928. The input device 929 includes, for example, a touch sensor for detecting a touch on the screen of the display device 930, a button, a switch, or other components and accepts operation or information input by a user. The display device 930 has a screen such as an LCD or an OLED display and displays a navigation function or an image of the content reproduced. The speaker 931 outputs sound of the navigation function or the content reproduced.

The wireless communication interface 933 supports a cellular communication scheme such as LTE or LTE-Advanced and performs wireless communication. The wireless communication interface 933 may typically include BB processors 934, RF circuits 935, and the like. A BB processor 934 may perform, for example, encoding/decoding, modulation/demodulation, multiplexing/demultiplexing, etc., and executes various types of signal processing for wireless communication. Meanwhile, an RF circuit 935 may include a mixer, a filter, and an amplifier, and transmits and receives a radio signal through an antenna 937. The wireless communication interface 933 may be a one-chip module in which the BB processors 934 and the RF circuits 935 are integrated. The wireless communication interface 933 may include a plurality of BB processors 934 and a plurality of RF circuits 935 as illustrated in FIG. 26. Note that although FIG. 26 illustrates the example in which the wireless communication interface 933 includes a plurality of BB processors 934 and a plurality of RF circuits 935, the wireless communication interface 933 may include a single BB processor 934 or a single RF circuit 935.

Moreover, the wireless communication interface 933 may support other types of wireless communication schemes in addition to the cellular communication scheme, such as a short-distance wireless communication scheme, a proximity wireless communication scheme, or a wireless LAN system, in which case BB processors 934 and RF circuits 935 for each wireless communication scheme may be included.

Each of the antenna switches 936 switches a connection destination of an antenna 937 between multiple circuits (for example, circuits for different wireless communication schemes) included in the wireless communication interface 933.

Each of the antennas 937 includes a single or a plurality of antenna elements (for example, a plurality of antenna elements included in an MIMO antenna) and is used for transmission and reception of radio signals by the wireless communication interface 933. The car navigation device 920 may include a plurality of antennas 937 as illustrated in FIG. 26. Note that, although FIG. 26 illustrates an example in which the car navigation device 920 includes the plurality of antennas 937, the car navigation device 920 may include a single antenna 937.

The car navigation device 920 may further include antennas 937 for each wireless communication scheme. In this case, the antenna switches 936 may be omitted in the configuration of the car navigation device 920.

The battery 938 supplies electric power to each block of the car navigation device 920 illustrated in FIG. 26 via a power supply line partially indicated by a broken line in the drawing. The battery 938 also accumulates power supplied from the vehicle side.

In the car navigation device 920 illustrated in FIG. 26, one or more components (at least one of the communication control unit 241, the information acquiring unit 243, the determination unit 245, or the notification unit 247) included in the processing unit 240 described with reference to FIG. 3 may be implemented in the wireless communication interface 933. Alternatively, at least a part of these components may be implemented in the processor 921. As one example, the car navigation device 920 may be mounted with a module including a part or all of the wireless communication interface 933 (for example, the BB processors 934) and/or the processor 921, and the module may implement at least one of the above components. In this case, the module may store a program for causing the processor to function as at least one of the above components (in other words, a program for causing the processor to execute the operation of at least one of the above components) and execute the program. As another example, a program for causing the processor to function as at least one of the above components may be installed in the car navigation device 920, and the wireless communication interface 933 (for example, the BB processors 934) and/or the processor 921 may execute the program. As described above, the car navigation device 920 or the module may be provided as a device including at least one of the above components, and a program for causing the processor to function as at least one of the above components may be provided. Alternatively, a readable recording medium recording the above program may be provided.

Moreover, in the car navigation device 920 illustrated in FIG. 26, for example the wireless communication unit 220 described with reference to FIG. 3 may be implemented by the wireless communication interface 933 (for example, RF circuits 935). Moreover, the antenna unit 210 may be implemented by the antennas 937. In addition, the storage unit 230 may be implemented by the memory 922.

Moreover, the technology according to the present disclosure may be implemented as an in-vehicle system (or vehicle) 940 including one or more blocks of the car navigation device 920 described above, the in-vehicle network 941, and a vehicle-side module 942. That is, the in-vehicle system (or vehicle) 940 may be provided as a device including at least one of the communication control unit 241, the information acquiring unit 243, the determination unit 245, or the notification unit 247. The vehicle-side module 942 generates vehicle-side data such as the speed of the vehicle, the engine speed, or failure information and outputs the generated data to the in-vehicle network 941.

4. CONCLUSION

As described above, in the system according to the present embodiment, a terminal device 200 acquires first control information and second control information relating to a plurality of resources specified by the frequency and time that are available for data transmission. The terminal device 200 further arbitrarily selects a resource from the plurality of resources on the basis of the first control information to transmit data to a transmission target (that is, performs grant-free transmission). The terminal device 200 also controls selection of a resource to be used for data transmission from among the plurality of resources on the basis of the second control information. For example, the terminal device 200 may selectively switch whether or not to perform grant-free transmission or may limit resources used for grant-free transmission on the basis of the second control information.

In NR particularly, various use cases are assumed, and a mechanism is required that enables flexible design depending on a use case. Therefore, for example, even in a situation where grant-free transmission is available, it is possible to assume a situation in which grant-free transmission should not be performed or a situation in which it is desirable not to perform grant-free transmission. Even in such situations, according to the system of the present embodiment, it becomes possible to control the operation relating to grant-free transmission depending on a current situation on the basis of the second control information, such as control of whether or not to perform grant-free transmission or control of resources used for grant-free transmission Furthermore, by notifying a plurality of terminal devices 200 of the second control information as shared control information, it becomes unnecessary to individually notify the second control information to each of the terminal devices 200, thereby enabling reduction of the overhead in the amount of control channels. Therefore, according to the system of the present embodiment, the transmission efficiency of the entire system can be further improved.

In addition, each content described in regard to a base station of the embodiments described above can be similarly applied to, for example, a gNodeB (or gNB).

The preferred embodiments of the present disclosure have been described in detail with reference to the accompanying drawings; however, the technical scope of the present disclosure is not limited to such examples. It is clear that a person having ordinary knowledge in the technical field of the present disclosure can conceive various variations or modifications within the scope of the technical idea described in the claims, and it is understood that these variations or modifications also naturally belong to the technical scope of the present disclosure.

In addition, the effects described herein are merely illustrative or exemplary, and not limiting. That is, the technology according to the present disclosure may exert other effects apparent to those skilled in the art from the description of the present specification, together with or in place of the above effects.

Note that the following configuration is also within the technical scope of the present disclosure.

(1)

A communication device, including:

an acquisition unit configured to acquire first control information and second control information relating to a plurality of resources specified by a frequency and time available for data transmission; and a control unit configured to perform control in such a manner that data is transmitted to a transmission target after a resource is arbitrarily selected from the plurality of resources on the basis of the first control information, in which the control unit controls selection of the resource from among the plurality of resources on a basis of the second control information.

(2)

The communication device according to (1), in which the acquisition unit individually acquires the first control information and the second control information (3)

The communication device according to (2), in which the acquisition unit acquires the second control information after acquiring the first control information.

(4)

The communication device according to any one of (1) to (3), in which the control unit limits the resource to be selected from among the plurality of resources on a basis of the second control information.

(5)

The communication device according to any one of (1) to (4), in which the second control information is notified to a plurality of communication devices as a target.

(6)

The communication device according to any one of (1) to (5), in which the first control information is notified semi-statically.

(7)

The communication device according to (6), in which the first control information is notified on a basis of predetermined signaling.

(8)

The communication device according to any one of (1) to (7), in which the second control information includes information relating to a resource availability of which for data transmission is limited.

(9)

The communication device according to any one of (1) to (7), in which the second control information includes information relating to at least one of a frequency or time of a resource available for data transmission.

(10)

The communication device according to any one of (1) to (7), in which the second control information includes information relating to communication setting for switching a plurality of wireless links including at least an uplink in a time-dividing manner, and the control unit performs control in such a manner that the data is transmitted to the transmission target after a resource corresponding to a period set for the uplink is selected from among the plurality of resources on a basis of the information relating to the communication setting.

(11)

The communication device according to any one of (1) to (7), in which the second control information includes information relating to a frame structure used for data transmission in communication in which a plurality of wireless links including at least an uplink is switched in a time-dividing manner, and the control unit performs control in such a manner that the data is transmitted to the transmission target after a resource corresponding to a period set for the uplink is selected from among the plurality of resources on a basis of the information relating to the frame structure.

(12)

The communication device according to any one of (1) to (11), in which, in a case where the second control information includes information relating to a resource allocated for use in data transmission, the control unit performs control in such a manner that the allocated resource is used for the data transmission.

(13)

The communication device according to any one of (1) to (11), in which, in a case where the second control information includes information relating to a first resource allocated for use in data transmission and the first resource is not included in the plurality of resources, the control unit performs control in such a manner that the first resource and a second resource arbitrarily selected from the plurality of resources are used for the data transmission.

(14)

The communication device according to any one of (1) to (11), in which, in a case where the second control information includes information relating to a resource allocated for use in data transmission and the resource is not included in the plurality of resources, the control unit performs control in such a manner that the allocated resource is used for the data transmission.

(15)

The communication device according to any one of (1) to (11), in which, in a case where the second control information includes information relating to a first resource allocated for use in data transmission and the first resource is included in the plurality of resources, the control unit performs control in such a manner that the allocated first resource is used for the data transmission.

(16)

A communication device, including:

a notification unit configured to notify a terminal device of first control information and second control information relating to a plurality of resources specified by a frequency and time available for data transmission; and a reception unit configured to receive data transmitted from the terminal device using a resource selected from among the plurality of resources, in which selection of the resource from among the plurality of resources in the terminal device is controlled on a basis of the second control information.

(17)

A communication method, by a computer, including:

acquiring first control information and second control information relating to a plurality of resources specified by a frequency and time available for data transmission; and performing control in such a manner that data is transmitted to a transmission target after a resource is arbitrarily selected from the plurality of resources on the basis of the first control information, in which selection of the resource from among the plurality of resources is controlled on a basis of the second control information.

(18)

A communication method, by a computer, including:

notifying a terminal device of first control information and second control information relating to a plurality of resources specified by a frequency and time available for data transmission; and receiving data transmitted from the terminal device using a resource selected from among the plurality of resources, in which selection of the resource from among the plurality of resources in the terminal device is controlled on a basis of the second control information.

(19)

A program for causing a computer to execute:

acquiring first control information and second control information relating to a plurality of resources specified by a frequency and time available for data transmission; and performing control in such a manner that data is transmitted to a transmission target after a resource is arbitrarily selected from the plurality of resources on the basis of the first control information, in which selection of the resource from among the plurality of resources is controlled on a basis of the second control information.

(20)

A program for causing a computer to execute:

notifying a terminal device of first control information and second control information relating to a plurality of resources specified by a frequency and time available for data transmission; and receiving data transmitted from the terminal device using a resource selected from among the plurality of resources, in which selection of the resource from among the plurality of resources in the terminal device is controlled on a basis of the second control information.

REFERENCE SIGNS LIST

1 System
100 Base station
110 Antenna unit
120 Wireless communication unit
130 Network communication unit
140 Storage unit
150 Processing unit
151 Communication control unit
153 Information acquiring unit
157 Notification unit
200 Terminal device
210 Antenna unit
220 Wireless communication unit
230 Storage unit
240 Processing unit
241 Communication control unit
243 Information acquiring unit
245 Determination unit
247 Notification unit

The invention claimed is:

1. A terminal device comprising circuitry configured to:
acquire, from a base station device:
first control information relating to one or more grant-free resources, specified by a frequency and time for the terminal device wherein the first control information is acquired by the terminal device using Radio Resource Control (RRC) signaling; and
second control information including slot format information for Time Division Duplexing (TDD), wherein the slot format information indicates information about which period is set for downlink and which period is set for uplink in a slot,
determine the one or more grant-free resources for a grant-free transmission based on the first control information;
determine, based on the second control information, whether the selected one or more grant-free resources is available for the grant-free transmission; and
transmit data as the grant-free transmission using the selected one or more grant-free resources only after the selected one or more grant-free resources is determined to be available for the grant-free transmission,
wherein the determination whether the selected one or more grant-free resources is available for the grant-free transmission includes a determination of appropriate timing for the grant-free transmission using the one or more grant-free resources,
wherein the determination of the appropriate timing includes:
on condition that the slot format information indicates downlink only, the grant-free transmission is not performed,
on condition that the slot format information indicates uplink only, the grant-free transmission is performed, and
on condition that the slot format information indicates both downlink and uplink being mixed, the grant-free transmission is performed only at uplink timing,
wherein the grant-free transmission is further controlled not to be performed in a section corresponding to symbols where NR-SS (New Radio Synchronization Signal) and a broadcast channel are transmitted,
wherein the NR-SS comprises a Primary Synchronization Signal (PSS) and a Secondary Synchronization Signal (SSS), and
wherein the broadcast channel carries master information.

2. The terminal device according to claim 1, wherein the circuitry is further configured to limit the grant-free resource to be selected from among a plurality of resources on a basis of the second control information.

3. The terminal device according to claim 1, wherein the first control information is notified semi-statically.

4. The terminal device according to claim 3, wherein the first control information is notified on a basis of predetermined signaling.

5. The terminal device according to claim 1, wherein the second control information further includes information relating to a resource availability of which for data transmission is limited or information relating to at least one of a frequency or time of a resource available for transmission.

6. The terminal device according to claim 1,
wherein the second control information further includes information relating to communication setting for switching a plurality of wireless links including at least an uplink in a time-dividing manner, and
the circuitry is further configured to perform control in such a manner that the data is transmitted to the transmission target after the one or more grant-free resources corresponding to a period set for the uplink is selected from among the one or more grant-free resources on a basis of the information relating to the communication setting.

7. The terminal device according to claim 1, wherein the second control information further includes information relating to a frame structure used for data transmission in communication in which a plurality of wireless links including at least an uplink is switched in a time-dividing manner, and the circuitry is further configured to perform control in such a manner that the data is transmitted to the transmission target after the one or more grant-free resources corresponding to a period set for the uplink is selected from among the one or more grant-free resources on a basis of the information relating to the frame structure.

8. The terminal device according to claim 1, wherein, in a case where the second control information includes information relating to the one or more grant-free resources allocated for use in data transmission, the circuitry is further configured to perform control in such a manner that the allocated one or more grant free resources is used for the data transmission.

9. The terminal device according to claim 1, wherein, in a case where the second control information includes information relating to a first grant-free resource allocated for use in data transmission and the first grant-free resource is not included in the one or more grant-free resources, the circuitry is further configured to perform control in such a manner that the first resource and a second resource arbitrarily selected from the one or more grant-free resources are used for the data transmission.

10. The terminal device according to claim 1, wherein, in a case where the second control information includes information relating to a resource allocated for use in data transmission and the resource is not included in the one or more grant-free resources, the circuitry is further configured to perform control in such a manner that the allocated resource is used for the data transmission.

11. The terminal device according to claim 1, wherein, in a case where the second control information includes information relating to a first resource allocated for use in data transmission and the first resource is included in the one or more grant-free resources, the circuitry is further configured to perform control in such a manner that the allocated first resource is used for the data transmission.

12. A communication method, by a terminal device, comprising:
acquiring, from a base station device:
first control information relating to one or more grant-free resources, specified by a frequency and time for the terminal device wherein the first control information is acquired by the terminal device using Radio Resource Control (RRC) signaling; and
second control information including slot format information for Time Division Duplexing (TDD), wherein the slot format information indicates information about which period is set for downlink and which period is set for uplink in a slot,
determine the one or more grant-free resources for a grant-free transmission based on the first control information;
determining, based on the second control information, whether the selected one or more grant-free resources is available for the grant-free transmission; and
transmitting data as the grant-free transmission using the selected one or more grant-free resources only after the selected one or more grant-free resources is determined to be available for the grant-free transmission,
wherein determining whether the selected one or more grant-free resources is available for the grant-free transmission includes determining appropriate timing for the grant-free transmission using the one or more grant-free resources,
wherein determining the appropriate timing includes:
on condition that the slot format information indicates downlink only, the grant-free transmission is not performed,
on condition that the slot format information indicates uplink only, the grant-free transmission is performed, and
on condition that the slot format information indicates both downlink and uplink being mixed, the grant-free transmission is performed only at uplink timing,
wherein the grant-free transmission is further controlled not to be performed in a section corresponding to symbols where NR-SS (New Radio Synchronization Signal) and a broadcast channel are transmitted,
wherein the NR-SS comprises a Primary Synchronization Signal (PSS) and a Secondary Synchronization Signal (SSS), and
wherein the broadcast channel carries master information.

13. A program for causing a computer to execute the steps of claim 12 when said program is carried out on the computer.

* * * * *